US012177097B2

(12) United States Patent
Gupta et al.

(10) Patent No.: US 12,177,097 B2
(45) Date of Patent: *Dec. 24, 2024

(54) POLICY UTILIZATION ANALYSIS

(71) Applicant: Cisco Technology, Inc., San Jose, CA (US)

(72) Inventors: Sunil Kumar Gupta, Milpitas, CA (US); Navindra Yadav, Cupertino, CA (US); Michael Standish Watts, Mill Valley, CA (US); Ali Parandehgheibi, Sunnyvale, CA (US); Shashidhar Gandham, Fremont, CA (US); Ashutosh Kulshreshtha, Cupertino, CA (US); Khawar Deen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,125

(22) Filed: Sep. 20, 2023

(65) Prior Publication Data
US 2024/0015084 A1 Jan. 11, 2024

Related U.S. Application Data

(63) Continuation of application No. 17/153,785, filed on Jan. 20, 2021, now Pat. No. 11,968,103, which is a
(Continued)

(51) Int. Cl.
*H04L 43/045* (2022.01)
*G06F 3/0482* (2013.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ......... H04L 43/045; H04L 1/242; H04L 7/10; H04L 9/0866; H04L 9/3239;
(Continued)

(56) References Cited

U.S. PATENT DOCUMENTS 5,086,385 A 2/1992 Launey et al.
5,319,754 A 6/1994 Meinecke et al.
(Continued)

FOREIGN PATENT DOCUMENTS

CN 1486555 A 3/2004
CN 101465763 A 6/2009
(Continued)

OTHER PUBLICATIONS

Li B., et al, "A Supervised Machine Learning Approach to Classify Host Roles on Line Using Sflow," In Proceedings of the First Edition Workshop on High Performance and Programmable Networking, Association for Computing Machinery—ACM, New York, USA, Jun. 18, 2013, pp. 53-60, Provided in IDS dated Apr. 27, 2016.
(Continued)

*Primary Examiner* — Joe Chacko
(74) *Attorney, Agent, or Firm* — Polsinelli P.C.

(57) ABSTRACT

An example method according to some embodiments includes receiving flow data for a packet traversing a network. The method continues by determining a source endpoint group and a destination endpoint group for the packet. The method continues by determining that a policy was utilized, the policy being applicable to the endpoint group. Finally, the method includes updating utilization data for the policy based on the flow data.

20 Claims, 8 Drawing Sheets

Related U.S. Application Data continuation of application No. 15/045,202, filed on Feb. 16, 2016, now Pat. No. 10,904,116.

(60) Provisional application No. 62/171,899, filed on Jun. 5, 2015.

(51) Int. Cl.

| | |
|---|---|
| G06F 3/04842 | (2022.01) |
| G06F 3/04847 | (2022.01) |
| G06F 9/455 | (2018.01) |
| G06F 16/11 | (2019.01) |
| G06F 16/13 | (2019.01) |
| G06F 16/16 | (2019.01) |
| G06F 16/17 | (2019.01) |
| G06F 16/174 | (2019.01) |
| G06F 16/23 | (2019.01) |
| G06F 16/2457 | (2019.01) |
| G06F 16/248 | (2019.01) |
| G06F 16/28 | (2019.01) |
| G06F 16/29 | (2019.01) |
| G06F 16/9535 | (2019.01) |
| G06F 21/53 | (2013.01) |
| G06F 21/55 | (2013.01) |
| G06F 21/56 | (2013.01) |
| G06N 20/00 | (2019.01) |
| G06N 99/00 | (2019.01) |
| G06T 11/20 | (2006.01) |
| H04J 3/06 | (2006.01) |
| H04J 3/14 | (2006.01) |
| H04L 1/24 | (2006.01) |
| H04L 7/10 | (2006.01) |
| H04L 9/08 | (2006.01) |
| H04L 9/32 | (2006.01) |
| H04L 9/40 | (2022.01) |
| H04L 41/046 | (2022.01) |
| H04L 41/0668 | (2022.01) |
| H04L 41/0803 | (2022.01) |
| H04L 41/0806 | (2022.01) |
| H04L 41/0816 | (2022.01) |
| H04L 41/0893 | (2022.01) |
| H04L 41/12 | (2022.01) |
| H04L 41/16 | (2022.01) |
| H04L 41/22 | (2022.01) |
| H04L 43/02 | (2022.01) |
| H04L 43/026 | (2022.01) |
| H04L 43/04 | (2022.01) |
| H04L 43/062 | (2022.01) |
| H04L 43/08 | (2022.01) |
| H04L 43/0805 | (2022.01) |
| H04L 43/0811 | (2022.01) |
| H04L 43/0829 | (2022.01) |
| H04L 43/0852 | (2022.01) |
| H04L 43/0864 | (2022.01) |
| H04L 43/0876 | (2022.01) |
| H04L 43/0882 | (2022.01) |
| H04L 43/0888 | (2022.01) |
| H04L 43/10 | (2022.01) |
| H04L 43/106 | (2022.01) |
| H04L 43/12 | (2022.01) |
| H04L 43/16 | (2022.01) |
| H04L 45/00 | (2022.01) |
| H04L 45/302 | (2022.01) |
| H04L 45/50 | (2022.01) |
| H04L 45/74 | (2022.01) |
| H04L 47/11 | (2022.01) |
| H04L 47/20 | (2022.01) |
| H04L 47/2441 | (2022.01) |
| H04L 47/2483 | (2022.01) |
| H04L 47/28 | (2022.01) |
| H04L 47/31 | (2022.01) |
| H04L 47/32 | (2022.01) |
| H04L 61/5007 | (2022.01) |
| H04L 67/01 | (2022.01) |
| H04L 67/10 | (2022.01) |
| H04L 67/1001 | (2022.01) |
| H04L 67/12 | (2022.01) |
| H04L 67/51 | (2022.01) |
| H04L 67/75 | (2022.01) |
| H04L 69/16 | (2022.01) |
| H04L 69/22 | (2022.01) |
| H04W 72/54 | (2023.01) |
| H04W 84/18 | (2009.01) |
| H04L 67/50 | (2022.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/2322* (2019.01); *G06F 16/235* (2019.01); *G06F 16/2365* (2019.01); *G06F 16/24578* (2019.01); *G06F 16/248* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/556* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 7/10* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/026* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/5007* (2022.05); *H04L 63/0227* (2013.01); *H04L 63/0263* (2013.01); *H04L 63/06* (2013.01);

H04L 63/0876 (2013.01); *H04L 63/1408*
(2013.01); *H04L 63/1416* (2013.01); *H04L*
*63/1425* (2013.01); *H04L 63/1433* (2013.01);
*H04L 63/1441* (2013.01); *H04L 63/145*
(2013.01); *H04L 63/1458* (2013.01); *H04L*
*63/1466* (2013.01); *H04L 63/16* (2013.01);
*H04L 63/20* (2013.01); *H04L 67/01* (2022.05);
*H04L 67/10* (2013.01); *H04L 67/1001*
(2022.05); *H04L 67/12* (2013.01); *H04L 67/51*
(2022.05); *H04L 67/75* (2022.05); *H04L 69/16*
(2013.01); *H04L 69/22* (2013.01); *H04W*
*72/54* (2023.01); *H04W 84/18* (2013.01);
*G06F 2009/4557* (2013.01); *G06F 2009/45587*
(2013.01); *G06F 2009/45591* (2013.01); *G06F*
*2009/45595* (2013.01); *G06F 2221/033*
(2013.01); *G06F 2221/2101* (2013.01); *G06F*
*2221/2105* (2013.01); *G06F 2221/2111*
(2013.01); *G06F 2221/2115* (2013.01); *G06F*
*2221/2145* (2013.01); *H04L 67/535* (2022.05)

(58) Field of Classification Search
CPC . H04L 9/3242; H04L 41/046; H04L 41/0668;
H04L 41/0803; H04L 41/0806; H04L
41/0816; H04L 41/0893; H04L 41/12;
H04L 41/16; H04L 41/22; H04L 43/02;
H04L 43/026; H04L 43/04; H04L 43/062;
H04L 43/08; H04L 43/0805; H04L
43/0811; H04L 43/0829; H04L 43/0841;
H04L 43/0858; H04L 43/0864; H04L
43/0876; H04L 43/0882; H04L 43/0888;
H04L 43/10; H04L 43/106; H04L 43/12;
H04L 43/16; H04L 45/306; H04L 45/38;
H04L 45/46; H04L 45/507; H04L 45/66;
H04L 45/74; H04L 47/11; H04L 47/20;
H04L 47/2441; H04L 47/2483; H04L
47/28; H04L 47/31; H04L 47/32; H04L
61/5007; H04L 63/0227; H04L 63/0263;
H04L 63/06; H04L 63/0876; H04L
63/1408; H04L 63/1416; H04L 63/1425;
H04L 63/1433; H04L 63/1441; H04L
63/145; H04L 63/1458; H04L 63/1466;
H04L 63/16; H04L 63/20; H04L 67/01;
H04L 67/10; H04L 67/1001; H04L 67/12;
H04L 67/51; H04L 67/75; H04L 69/16;
H04L 69/22; H04L 67/535; H04L 41/40;
H04L 43/20; H04L 41/0894; G06F
3/0482; G06F 3/04842; G06F 3/04847;
G06F 9/45558; G06F 16/122; G06F
16/137; G06F 16/162; G06F 16/17;
G06F 16/173; G06F 16/174; G06F 16/1744;
G06F 16/1748; G06F 16/2322; G06F
16/235; G06F 16/2365; G06F 16/24578;
G06F 16/248; G06F 16/285; G06F
16/288; G06F 16/29; G06F 16/9535;
G06F 21/53; G06F 21/552; G06F 21/556;
G06F 21/566; G06F 2009/4557; G06F
2009/45587; G06F 2009/45591; G06F
2009/45595; G06F 2221/033; G06F
2221/2101; G06F 2221/2105; G06F
2221/2111; G06F 2221/2115; G06F
2221/2145; G06N 20/00; G06N 99/00;
G06T 11/206; H04J 3/0661; H04J 3/14;
H04W 72/54; H04W 84/18
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,448,724 A | 9/1995 | Hayashi |
| 5,555,416 A | 9/1996 | Owens et al. |
| 5,726,644 A | 3/1998 | Jednacz et al. |
| 5,742,803 A | 4/1998 | Igarashi et al. |
| 5,742,829 A | 4/1998 | Davis et al. |
| 5,751,914 A | 5/1998 | Coley et al. |
| 5,794,047 A | 8/1998 | Meier |
| 5,822,731 A | 10/1998 | Schultz |
| 5,831,848 A | 11/1998 | Rielly et al. |
| 5,903,545 A | 5/1999 | Sabourin et al. |
| 5,949,974 A | 9/1999 | Ewing et al. |
| 6,012,096 A | 1/2000 | Link et al. |
| 6,026,362 A | 2/2000 | Kim et al. |
| 6,085,243 A | 7/2000 | Fletcher et al. |
| 6,115,462 A | 9/2000 | Servi et al. |
| 6,141,595 A | 10/2000 | Gloudeman et al. |
| 6,144,962 A | 11/2000 | Weinberg et al. |
| 6,192,402 B1 | 2/2001 | Iwase |
| 6,204,850 B1 | 3/2001 | Green |
| 6,215,898 B1 | 4/2001 | Woodfill et al. |
| 6,226,273 B1 | 5/2001 | Busuioc et al. |
| 6,230,312 B1 | 5/2001 | Hunt |
| 6,239,699 B1 | 5/2001 | Ronnen |
| 6,247,058 B1 | 6/2001 | Miller et al. |
| 6,249,241 B1 | 6/2001 | Jordan et al. |
| 6,279,035 B1 | 8/2001 | Brown et al. |
| 6,295,527 B1 | 9/2001 | McCormack et al. |
| 6,307,837 B1 | 10/2001 | Ichikawa et al. |
| 6,330,562 B1 | 12/2001 | Boden et al. |
| 6,338,131 B1 | 1/2002 | Dillon |
| 6,351,843 B1 | 2/2002 | Berkley et al. |
| 6,353,775 B1 | 3/2002 | Nichols |
| 6,381,735 B1 | 4/2002 | Hunt |
| 6,499,137 B1 | 12/2002 | Hunt |
| 6,525,658 B2 | 2/2003 | Streetman et al. |
| 6,546,420 B1 | 4/2003 | Lemler et al. |
| 6,546,553 B1 | 4/2003 | Hunt |
| 6,597,663 B1 | 7/2003 | Rekhter |
| 6,611,896 B1 | 8/2003 | Mason, Jr. et al. |
| 6,629,123 B1 | 9/2003 | Hunt |
| 6,633,909 B1 | 10/2003 | Barrett et al. |
| 6,654,750 B1 | 11/2003 | Adams et al. |
| 6,718,414 B1 | 4/2004 | Doggett |
| 6,728,779 B1 | 4/2004 | Griffin et al. |
| 6,751,663 B1 | 6/2004 | Farrell et al. |
| 6,774,899 B1 | 8/2004 | Ryall et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,965,861 B1 | 11/2005 | Dailey et al. |
| 6,983,323 B2 | 1/2006 | Cantrell et al. |
| 6,996,808 B1 | 2/2006 | Niewiadomski et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,036,049 B2 | 4/2006 | Ali et al. |
| 7,089,583 B2 | 8/2006 | Mehra et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,167,483 B1 | 1/2007 | Sharma et al. |
| 7,181,769 B1 | 2/2007 | Keanini et al. |
| 7,185,103 B1 | 2/2007 | Jain |
| 7,194,664 B1 | 3/2007 | Fung et al. |
| 7,203,740 B1 | 4/2007 | Putzolu et al. |
| 7,213,068 B1 | 5/2007 | Kohli et al. |
| 7,263,689 B1 | 8/2007 | Edwards et al. |

(56) References Cited

U.S. PATENT DOCUMENTS

| | | |
|---|---|---|
| 7,296,288 B1 | 11/2007 | Hill et al. |
| 7,302,487 B2 | 11/2007 | Ylonen et al. |
| 7,327,735 B2 | 2/2008 | Robotham et al. |
| 7,331,060 B1 | 2/2008 | Ricciulli |
| 7,337,206 B1 | 2/2008 | Wen et al. |
| 7,349,761 B1 | 3/2008 | Cruse |
| 7,353,507 B2 | 4/2008 | Gazdik et al. |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,453,879 B1 | 11/2008 | Lo |
| 7,454,486 B2 | 11/2008 | Kaler et al. |
| 7,466,681 B2 | 12/2008 | Ashwood-Smith et al. |
| 7,467,205 B1 | 12/2008 | Dempster et al. |
| 7,469,290 B1 | 12/2008 | Liubovich et al. |
| 7,496,040 B2 | 2/2009 | Seo |
| 7,496,575 B2 | 2/2009 | Buccella et al. |
| 7,496,661 B1 | 2/2009 | Morford et al. |
| 7,523,178 B2 | 4/2009 | Reeves et al. |
| 7,523,465 B2 | 4/2009 | Aamodt et al. |
| 7,523,493 B2 | 4/2009 | Liang et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,571,478 B2 | 8/2009 | Munson et al. |
| 7,606,203 B1 | 10/2009 | Shabtay et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,742,406 B1 | 6/2010 | Muppala |
| 7,742,413 B1 | 6/2010 | Bugenhagen |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,840,618 B2 | 11/2010 | Zhang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,870,204 B2 | 1/2011 | LeVasseur et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 7,990,847 B1 | 8/2011 | Leroy et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,040,832 B2 | 10/2011 | Nishio et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,135,847 B2 | 3/2012 | Pujol et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,181,253 B1 | 5/2012 | Zaitsev et al. |
| 8,185,343 B1 | 5/2012 | Fitzgerald et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,280,683 B2 | 10/2012 | Finkler |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,312,540 B1 | 11/2012 | Kahn et al. |
| 8,339,959 B1 | 12/2012 | Moisand et al. |
| 8,356,007 B2 | 1/2013 | Larson et al. |
| 8,365,005 B2 | 1/2013 | Bengtson et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,463,860 B1 | 6/2013 | Guruswamy et al. |
| 8,489,765 B2 | 7/2013 | Vasseur et al. |
| 8,494,985 B1 | 7/2013 | Keralapura et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,565,109 B1 | 10/2013 | Poovendran et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,578,491 B2 | 11/2013 | McNamee et al. |
| 8,588,081 B2 | 11/2013 | Salam et al. |
| 8,595,709 B2 | 11/2013 | Rao et al. |
| 8,600,726 B1 | 12/2013 | Varshney et al. |
| 8,612,530 B1 | 12/2013 | Sapovalovs et al. |
| 8,613,084 B2 | 12/2013 | Dalcher |
| 8,615,803 B2 | 12/2013 | Dacier et al. |
| 8,624,898 B1 | 1/2014 | Bugaj et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,689,172 B2 | 4/2014 | Amaral et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,779,921 B1 | 7/2014 | Curtiss |
| 8,793,255 B1 | 7/2014 | Bilinski et al. |
| 8,805,946 B1 | 8/2014 | Glommen |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,103 B2 | 9/2014 | Isaacson et al. |

(56) References Cited

U.S. PATENT DOCUMENTS

| | | |
|---|---|---|
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,887,285 B2 | 11/2014 | Jordan et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,924,941 B2 | 12/2014 | Krajec et al. |
| 8,931,043 B2 | 1/2015 | Cooper et al. |
| 8,954,546 B2 | 2/2015 | Krajec |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,063 B2 | 3/2015 | Krajec et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,043,905 B1 | 5/2015 | Allen et al. |
| 9,071,575 B2 | 6/2015 | Lemaster et al. |
| 9,088,598 B1 | 7/2015 | Zhang et al. |
| 9,104,543 B1 | 8/2015 | Cavanagh et al. |
| 9,110,905 B2 | 8/2015 | Polley et al. |
| 9,117,075 B1 | 8/2015 | Yeh |
| 9,122,599 B1 | 9/2015 | Jaladanki et al. |
| 9,130,836 B2 | 9/2015 | Kapadia et al. |
| 9,135,145 B2 | 9/2015 | Voccio et al. |
| 9,141,912 B2 | 9/2015 | Shircliff et al. |
| 9,141,914 B2 | 9/2015 | Viswanathan et al. |
| 9,146,820 B2 | 9/2015 | Alfadhly et al. |
| 9,152,789 B2 | 10/2015 | Natarajan et al. |
| 9,158,720 B2 | 10/2015 | Shirlen et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,179,058 B1 | 11/2015 | Zeira et al. |
| 9,185,127 B2 | 11/2015 | Neou et al. |
| 9,191,042 B2 | 11/2015 | Dhayni |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,252,915 B1 | 2/2016 | Bakken |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,276,829 B2 | 3/2016 | Castro et al. |
| 9,281,940 B2 | 3/2016 | Matsuda et al. |
| 9,286,047 B1 | 3/2016 | Avramov et al. |
| 9,292,415 B2 | 3/2016 | Seto et al. |
| 9,294,486 B1 | 3/2016 | Chiang et al. |
| 9,294,498 B1 | 3/2016 | Yampolskiy et al. |
| 9,300,689 B2 | 3/2016 | Tsuchitoi |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,385,917 B1 | 7/2016 | Khanna et al. |
| 9,396,327 B2 | 7/2016 | Auger et al. |
| 9,397,902 B2 | 7/2016 | Dragon et al. |
| 9,405,903 B1 | 8/2016 | Xie et al. |
| 9,413,615 B1 | 8/2016 | Singh et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,483,334 B2 | 11/2016 | Walsh |
| 9,487,222 B2 | 11/2016 | Palmer et al. |
| 9,501,744 B1 | 11/2016 | Brisebois et al. |
| 9,531,589 B2 | 12/2016 | Clemm et al. |
| 9,536,084 B1 | 1/2017 | Lukacs et al. |
| 9,552,221 B1 | 1/2017 | Pora |
| 9,563,517 B1 | 2/2017 | Natanzon et al. |
| 9,575,869 B2 | 2/2017 | Pechanec et al. |
| 9,575,874 B2 | 2/2017 | Gautallin et al. |
| 9,576,240 B2 | 2/2017 | Jeong et al. |
| 9,582,669 B1 | 2/2017 | Shen et al. |
| 9,596,196 B1 | 3/2017 | Hills |
| 9,602,536 B1 | 3/2017 | Brown, Jr. et al. |
| 9,621,413 B1 | 4/2017 | Lee |
| 9,621,575 B1 | 4/2017 | Jalan et al. |
| 9,634,915 B2 | 4/2017 | Bley |
| 9,645,892 B1 | 5/2017 | Patwardhan |
| 9,658,942 B2 | 5/2017 | Bhat et al. |
| 9,665,474 B2 | 5/2017 | Li et al. |
| 9,678,803 B2 | 6/2017 | Suit |
| 9,684,453 B2 | 6/2017 | Holt et al. |
| 9,686,233 B2 | 6/2017 | Paxton |
| 9,697,033 B2 | 7/2017 | Koponen et al. |
| 9,727,394 B2 | 8/2017 | Xun et al. |
| 9,729,568 B2 | 8/2017 | Lefebvre et al. |
| 9,733,973 B2 | 8/2017 | Prasad et al. |
| 9,736,041 B2 | 8/2017 | Lumezanu et al. |
| 9,749,145 B2 | 8/2017 | Banavalikar et al. |
| 9,800,608 B2 | 10/2017 | Korsunsky et al. |
| 9,804,830 B2 | 10/2017 | Raman et al. |
| 9,804,951 B2 | 10/2017 | Liu et al. |
| 9,813,307 B2 | 11/2017 | Walsh et al. |
| 9,813,324 B2 | 11/2017 | Nampelly et al. |
| 9,813,516 B2 | 11/2017 | Wang |
| 9,825,911 B1 | 11/2017 | Brandwine |
| 9,836,183 B1 | 12/2017 | Love et al. |
| 9,857,825 B1 | 1/2018 | Johnson et al. |
| 9,858,621 B1 | 1/2018 | Konrardy et al. |
| 9,860,208 B1 | 1/2018 | Ettema et al. |
| 9,904,584 B2 | 2/2018 | Konig et al. |
| 9,916,232 B2 | 3/2018 | Voccio et al. |
| 9,916,538 B2 | 3/2018 | Zadeh et al. |
| 9,935,851 B2 | 4/2018 | Gandham et al. |
| 9,967,158 B2 | 5/2018 | Pang et al. |
| 9,979,615 B2 | 5/2018 | Kulshreshtha et al. |
| 9,996,529 B2 | 6/2018 | McCandless et al. |
| 10,002,187 B2 | 6/2018 | McCandless et al. |
| 10,009,240 B2 | 6/2018 | Rao et al. |
| 10,116,531 B2 | 10/2018 | Attar et al. |
| 10,142,353 B2 | 11/2018 | Yadav et al. |
| 10,171,319 B2 | 1/2019 | Yadav et al. |
| 10,243,862 B2 | 3/2019 | Cafarelli et al. |
| 10,394,692 B2 | 8/2019 | Liu et al. |
| 10,447,551 B1 | 10/2019 | Zhang et al. |
| 10,454,793 B2 | 10/2019 | Deen et al. |
| 10,454,999 B2 | 10/2019 | Eder |
| 10,476,982 B2 | 11/2019 | Tarre et al. |
| 10,516,586 B2 | 12/2019 | Gandham et al. |
| 10,652,225 B2 | 5/2020 | Koved et al. |
| 10,686,804 B2 | 6/2020 | Yadav et al. |
| 10,749,890 B1 | 8/2020 | Aloisio et al. |
| 10,944,683 B1 | 3/2021 | Roskind |
| 11,368,378 B2 | 6/2022 | Gandham et al. |
| 11,516,098 B2 | 11/2022 | Spadaro et al. |
| 11,528,283 B2 | 12/2022 | Yadav et al. |
| 11,556,808 B1 | 1/2023 | Kim et al. |
| 2001/0028646 A1 | 10/2001 | Arts et al. |
| 2002/0023210 A1 | 2/2002 | Tuomenoksa et al. |
| 2002/0053033 A1 | 5/2002 | Cooper et al. |
| 2002/0083175 A1 | 6/2002 | Afek et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0107875 A1 | 8/2002 | Seliger et al. |
| 2002/0141343 A1 | 10/2002 | Bays |
| 2002/0169739 A1 | 11/2002 | Carr et al. |
| 2002/0184393 A1 | 12/2002 | Leddy et al. |

(56) References Cited

U.S. PATENT DOCUMENTS

| | | |
|---|---|---|
| 2002/0196292 A1 | 12/2002 | Itoh et al. |
| 2003/0005145 A1 | 1/2003 | Bullard |
| 2003/0016627 A1 | 1/2003 | MeLampy et al. |
| 2003/0023600 A1 | 1/2003 | Nagamura et al. |
| 2003/0023601 A1 | 1/2003 | Fortier, Jr. et al. |
| 2003/0035140 A1 | 2/2003 | Tomita et al. |
| 2003/0046388 A1 | 3/2003 | Milliken |
| 2003/0065986 A1 | 4/2003 | Fraenkel et al. |
| 2003/0069953 A1 | 4/2003 | Bottom et al. |
| 2003/0072269 A1 | 4/2003 | Teruhi et al. |
| 2003/0084158 A1 | 5/2003 | Saito et al. |
| 2003/0086425 A1 | 5/2003 | Bearden et al. |
| 2003/0097439 A1 | 5/2003 | Strayer et al. |
| 2003/0105976 A1 | 6/2003 | Copeland, III |
| 2003/0126242 A1 | 7/2003 | Chang |
| 2003/0133443 A1 | 7/2003 | Klinker et al. |
| 2003/0145232 A1 | 7/2003 | Poletto et al. |
| 2003/0149888 A1 | 8/2003 | Yadav |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2003/0206205 A1 | 11/2003 | Kawahara et al. |
| 2004/0019676 A1 | 1/2004 | Iwatsuki et al. |
| 2004/0030776 A1 | 2/2004 | Cantrell et al. |
| 2004/0036478 A1 | 2/2004 | Logvinov et al. |
| 2004/0046787 A1 | 3/2004 | Henry et al. |
| 2004/0049698 A1 | 3/2004 | Ott et al. |
| 2004/0054680 A1 | 3/2004 | Kelley et al. |
| 2004/0111679 A1 | 6/2004 | Subasic et al. |
| 2004/0133640 A1 | 7/2004 | Yeager et al. |
| 2004/0133690 A1 | 7/2004 | Chauffour et al. |
| 2004/0137908 A1 | 7/2004 | Sinivaara et al. |
| 2004/0167921 A1 | 8/2004 | Carson et al. |
| 2004/0205536 A1 | 10/2004 | Newman et al. |
| 2004/0213221 A1 | 10/2004 | Civanlar et al. |
| 2004/0218532 A1 | 11/2004 | Khirman |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0068907 A1 | 3/2005 | Garg et al. |
| 2005/0083933 A1 | 4/2005 | Fine et al. |
| 2005/0104885 A1 | 5/2005 | Jager et al. |
| 2005/0108331 A1 | 5/2005 | Osterman |
| 2005/0122325 A1 | 6/2005 | Twait |
| 2005/0129017 A1 | 6/2005 | Guingo et al. |
| 2005/0138157 A1 | 6/2005 | Jung et al. |
| 2005/0154625 A1 | 7/2005 | Chua et al. |
| 2005/0166066 A1 | 7/2005 | Ahuja et al. |
| 2005/0177829 A1 | 8/2005 | Vishwanath |
| 2005/0177871 A1 | 8/2005 | Roesch et al. |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0210331 A1 | 9/2005 | Connelly et al. |
| 2005/0210533 A1 | 9/2005 | Copeland et al. |
| 2005/0228885 A1 | 10/2005 | Winfield et al. |
| 2005/0237948 A1 | 10/2005 | Wan et al. |
| 2005/0257244 A1 | 11/2005 | Joly et al. |
| 2005/0289244 A1 | 12/2005 | Sahu et al. |
| 2006/0004758 A1 | 1/2006 | Teng et al. |
| 2006/0026669 A1 | 2/2006 | Zakas |
| 2006/0048218 A1 | 3/2006 | Lingafelt et al. |
| 2006/0058218 A1 | 3/2006 | Syud et al. |
| 2006/0075396 A1 | 4/2006 | Surasinghe |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0098625 A1 | 5/2006 | King et al. |
| 2006/0101516 A1 | 5/2006 | Sudaharan et al. |
| 2006/0106550 A1 | 5/2006 | Morin et al. |
| 2006/0143432 A1 | 6/2006 | Rothman et al. |
| 2006/0156408 A1 | 7/2006 | Himberger et al. |
| 2006/0158266 A1 | 7/2006 | Yonekawa et al. |
| 2006/0158354 A1 | 7/2006 | Aberg et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0212556 A1 | 9/2006 | Yacoby et al. |
| 2006/0224398 A1 | 10/2006 | Lakshman et al. |
| 2006/0253566 A1 | 11/2006 | Stassinopoulos et al. |
| 2006/0265713 A1 | 11/2006 | Depro et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0010898 A1 | 1/2007 | Hosek et al. |
| 2007/0014275 A1 | 1/2007 | Bettink et al. |
| 2007/0019618 A1 | 1/2007 | Shaffer et al. |
| 2007/0025306 A1 | 2/2007 | Cox et al. |
| 2007/0044147 A1 | 2/2007 | Choi et al. |
| 2007/0067756 A1 | 3/2007 | Garza |
| 2007/0074288 A1 | 3/2007 | Chang et al. |
| 2007/0097976 A1 | 5/2007 | Wood et al. |
| 2007/0118654 A1 | 5/2007 | Jamkhedkar et al. |
| 2007/0124376 A1 | 5/2007 | Greenwell |
| 2007/0127491 A1 | 6/2007 | Verzijp et al. |
| 2007/0140131 A1 | 6/2007 | Malloy et al. |
| 2007/0150568 A1 | 6/2007 | Ruiz |
| 2007/0162420 A1 | 7/2007 | Ou et al. |
| 2007/0169179 A1 | 7/2007 | Narad |
| 2007/0177626 A1 | 8/2007 | Kotelba |
| 2007/0180526 A1 | 8/2007 | Copeland, III |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0199060 A1 | 8/2007 | Touboul |
| 2007/0201474 A1 | 8/2007 | Isobe |
| 2007/0209074 A1 | 9/2007 | Coffman |
| 2007/0211637 A1 | 9/2007 | Mitchell |
| 2007/0214348 A1 | 9/2007 | Danielsen |
| 2007/0220159 A1 | 9/2007 | Choi et al. |
| 2007/0223388 A1 | 9/2007 | Arad et al. |
| 2007/0230415 A1 | 10/2007 | Malik |
| 2007/0232265 A1 | 10/2007 | Park et al. |
| 2007/0250640 A1 | 10/2007 | Wells |
| 2007/0250930 A1 | 10/2007 | Aziz et al. |
| 2007/0280108 A1 | 12/2007 | Sakurai |
| 2007/0300061 A1 | 12/2007 | Kim et al. |
| 2008/0002697 A1 | 1/2008 | Anantharamaiah et al. |
| 2008/0013532 A1 | 1/2008 | Garner et al. |
| 2008/0017619 A1 | 1/2008 | Yamakawa et al. |
| 2008/0022385 A1 | 1/2008 | Crowell et al. |
| 2008/0028389 A1 | 1/2008 | Genty et al. |
| 2008/0040088 A1 | 2/2008 | Vankov et al. |
| 2008/0046708 A1 | 2/2008 | Fitzgerald et al. |
| 2008/0049633 A1 | 2/2008 | Edwards et al. |
| 2008/0052387 A1 | 2/2008 | Heinz et al. |
| 2008/0056124 A1 | 3/2008 | Nanda et al. |
| 2008/0066009 A1 | 3/2008 | Gardner et al. |
| 2008/0082662 A1 | 4/2008 | Dandliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0181100 A1 | 7/2008 | Yang et al. |
| 2008/0185621 A1 | 8/2008 | Yi et al. |
| 2008/0201109 A1 | 8/2008 | Zill et al. |
| 2008/0208367 A1 | 8/2008 | Koehler et al. |
| 2008/0222352 A1 | 9/2008 | Booth et al. |
| 2008/0232358 A1 | 9/2008 | Baker et al. |
| 2008/0247539 A1 | 10/2008 | Huang et al. |
| 2008/0250122 A1 | 10/2008 | Zsigmond et al. |
| 2008/0250128 A1 | 10/2008 | Sargent |
| 2008/0262990 A1 | 10/2008 | Kapoor et al. |

(56) References Cited

U.S. PATENT DOCUMENTS

| | | |
|---|---|---|
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0298271 A1 | 12/2008 | Morinaga et al. |
| 2008/0301755 A1 | 12/2008 | Sinha et al. |
| 2008/0301765 A1 | 12/2008 | Nicol et al. |
| 2008/0320592 A1 | 12/2008 | Suit et al. |
| 2009/0019026 A1 | 1/2009 | Valdes-Perez et al. |
| 2009/0059934 A1 | 3/2009 | Aggarwal et al. |
| 2009/0064332 A1 | 3/2009 | Porras et al. |
| 2009/0077097 A1 | 3/2009 | Lacapra et al. |
| 2009/0077543 A1 | 3/2009 | Siskind et al. |
| 2009/0077666 A1 | 3/2009 | Chen et al. |
| 2009/0106646 A1 | 4/2009 | Mollicone et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0158432 A1 | 6/2009 | Zheng et al. |
| 2009/0161658 A1 | 6/2009 | Danner et al. |
| 2009/0164565 A1 | 6/2009 | Underhill |
| 2009/0177484 A1 | 7/2009 | Davis et al. |
| 2009/0180393 A1 | 7/2009 | Nakamura |
| 2009/0192847 A1 | 7/2009 | Lipkin et al. |
| 2009/0193495 A1 | 7/2009 | McAfee et al. |
| 2009/0241170 A1 | 9/2009 | Kumar et al. |
| 2009/0249302 A1 | 10/2009 | Xu et al. |
| 2009/0252181 A1 | 10/2009 | Desanti |
| 2009/0260083 A1 | 10/2009 | Szeto et al. |
| 2009/0271412 A1 | 10/2009 | Lacapra et al. |
| 2009/0271504 A1 | 10/2009 | Ginter et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0310485 A1 | 12/2009 | Averi et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0005478 A1 | 1/2010 | Helfman et al. |
| 2010/0042716 A1 | 2/2010 | Farajidana et al. |
| 2010/0049839 A1 | 2/2010 | Parker et al. |
| 2010/0054241 A1 | 3/2010 | Shah et al. |
| 2010/0070647 A1 | 3/2010 | Irino et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0128598 A1 | 5/2010 | Gandhewar et al. |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0157809 A1 | 6/2010 | Duffield et al. |
| 2010/0161817 A1 | 6/2010 | Xiao et al. |
| 2010/0174813 A1 | 7/2010 | Hildreth et al. |
| 2010/0180016 A1 | 7/2010 | Bugwadia et al. |
| 2010/0185901 A1 | 7/2010 | Hirsch |
| 2010/0188989 A1 | 7/2010 | Wing et al. |
| 2010/0188995 A1 | 7/2010 | Raleigh |
| 2010/0194741 A1 | 8/2010 | Finocchio |
| 2010/0220584 A1 | 9/2010 | DeHaan et al. |
| 2010/0226373 A1 | 9/2010 | Rowell et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0246432 A1 | 9/2010 | Zhang et al. |
| 2010/0287266 A1 | 11/2010 | Asati et al. |
| 2010/0303240 A1 | 12/2010 | Beachem et al. |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055382 A1 | 3/2011 | Narasimhan |
| 2011/0055388 A1 | 3/2011 | Yumerefendi et al. |
| 2011/0060704 A1 | 3/2011 | Rubin et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083124 A1 | 4/2011 | Moskal et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0125894 A1 | 5/2011 | Anderson et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0158112 A1 | 6/2011 | Finn et al. |
| 2011/0158410 A1 | 6/2011 | Falk et al. |
| 2011/0167435 A1 | 7/2011 | Fang |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0191465 A1 | 8/2011 | Hofstaedter et al. |
| 2011/0196957 A1 | 8/2011 | Ayachitula et al. |
| 2011/0202655 A1 | 8/2011 | Sharma et al. |
| 2011/0202761 A1 | 8/2011 | Sarela et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0231510 A1 | 9/2011 | Korsunsky et al. |
| 2011/0238793 A1 | 9/2011 | Bedare et al. |
| 2011/0239058 A1 | 9/2011 | Umezuki |
| 2011/0239194 A1 | 9/2011 | Braude |
| 2011/0246663 A1 | 10/2011 | Melsen et al. |
| 2011/0267952 A1 | 11/2011 | Ko et al. |
| 2011/0276951 A1 | 11/2011 | Jain |
| 2011/0277034 A1 | 11/2011 | Hanson |
| 2011/0283266 A1 | 11/2011 | Gallagher et al. |
| 2011/0283277 A1 | 11/2011 | Castillo et al. |
| 2011/0289122 A1 | 11/2011 | Grube et al. |
| 2011/0289301 A1 | 11/2011 | Allen et al. |
| 2011/0302295 A1 | 12/2011 | Westerfeld et al. |
| 2011/0302652 A1 | 12/2011 | Westerfeld |
| 2011/0310892 A1 | 12/2011 | DiMambro |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0011153 A1 | 1/2012 | Buchanan et al. |
| 2012/0016972 A1 | 1/2012 | Tamura |
| 2012/0017262 A1 | 1/2012 | Kapoor et al. |
| 2012/0047394 A1 | 2/2012 | Jain et al. |
| 2012/0075999 A1 | 3/2012 | Ko et al. |
| 2012/0079592 A1 | 3/2012 | Pandrangi |
| 2012/0089664 A1 | 4/2012 | Igelka |
| 2012/0096394 A1 | 4/2012 | Balko et al. |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0144030 A1 | 6/2012 | Narasimhan |
| 2012/0167057 A1 | 6/2012 | Schmich et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0216282 A1 | 8/2012 | Pappu et al. |

(56) References Cited

U.S. PATENT DOCUMENTS

| | | |
|---|---|---|
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0255875 A1 | 10/2012 | Vicente et al. |
| 2012/0260135 A1 | 10/2012 | Beck et al. |
| 2012/0260227 A1 | 10/2012 | Shukla et al. |
| 2012/0260236 A1 | 10/2012 | Basak et al. |
| 2012/0268405 A1 | 10/2012 | Ferren et al. |
| 2012/0278021 A1 | 11/2012 | Lin et al. |
| 2012/0281700 A1 | 11/2012 | Koganti et al. |
| 2012/0287815 A1 | 11/2012 | Attar |
| 2012/0300628 A1 | 11/2012 | Prescott et al. |
| 2013/0003538 A1 | 1/2013 | Greenberg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0019008 A1 | 1/2013 | Jorgenson et al. |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0055145 A1 | 2/2013 | Antony et al. |
| 2013/0055373 A1 | 2/2013 | Beacham et al. |
| 2013/0064096 A1 | 3/2013 | Degioanni et al. |
| 2013/0080375 A1 | 3/2013 | Viswanathan et al. |
| 2013/0085889 A1 | 4/2013 | Fitting et al. |
| 2013/0086272 A1 | 4/2013 | Chen et al. |
| 2013/0094372 A1 | 4/2013 | Boot |
| 2013/0094376 A1 | 4/2013 | Reeves |
| 2013/0097706 A1 | 4/2013 | Titonis et al. |
| 2013/0103827 A1 | 4/2013 | Dunlap et al. |
| 2013/0107709 A1 | 5/2013 | Campbell et al. |
| 2013/0114598 A1 | 5/2013 | Schrum et al. |
| 2013/0117748 A1 | 5/2013 | Cooper et al. |
| 2013/0117847 A1 | 5/2013 | Friedman et al. |
| 2013/0122854 A1 | 5/2013 | Agarwal et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0160128 A1 | 6/2013 | Dolan-Gavitt et al. |
| 2013/0166730 A1 | 6/2013 | Wilkinson |
| 2013/0173784 A1 | 7/2013 | Wang et al. |
| 2013/0173787 A1 | 7/2013 | Tateishi et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198509 A1 | 8/2013 | Buruganahalli et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205137 A1 | 8/2013 | Farrugia et al. |
| 2013/0205293 A1 | 8/2013 | Levijarvi et al. |
| 2013/0219161 A1 | 8/2013 | Fontignie et al. |
| 2013/0219263 A1 | 8/2013 | Abrahami |
| 2013/0219500 A1 | 8/2013 | Lukas et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283240 A1 | 10/2013 | Krajec et al. |
| 2013/0283281 A1 | 10/2013 | Krajec et al. |
| 2013/0283374 A1 | 10/2013 | Zisapel et al. |
| 2013/0290521 A1 | 10/2013 | Labovitz et al. |
| 2013/0297771 A1 | 11/2013 | Osterloh et al. |
| 2013/0298244 A1 | 11/2013 | Kumar et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0308468 A1 | 11/2013 | Cowie |
| 2013/0312097 A1 | 11/2013 | Turnbull |
| 2013/0318357 A1 | 11/2013 | Abraham et al. |
| 2013/0322441 A1 | 12/2013 | Anumala |
| 2013/0326623 A1 | 12/2013 | Kruglick |
| 2013/0326625 A1 | 12/2013 | Anderson et al. |
| 2013/0332773 A1 | 12/2013 | Yuan et al. |
| 2013/0333029 A1 | 12/2013 | Chesla et al. |
| 2013/0335219 A1 | 12/2013 | Malkowski |
| 2013/0336164 A1 | 12/2013 | Yang et al. |
| 2013/0343207 A1 | 12/2013 | Cook et al. |
| 2013/0346054 A1 | 12/2013 | Mumtaz |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0009338 A1 | 1/2014 | Lin et al. |
| 2014/0012562 A1 | 1/2014 | Chang et al. |
| 2014/0012814 A1 | 1/2014 | Bercovici et al. |
| 2014/0019972 A1 | 1/2014 | Yahalom et al. |
| 2014/0020099 A1 | 1/2014 | Vaidyanathan et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047274 A1 | 2/2014 | Lumezanu et al. |
| 2014/0047372 A1 | 2/2014 | Gnezdov et al. |
| 2014/0050222 A1 | 2/2014 | Lynar et al. |
| 2014/0053226 A1 | 2/2014 | Fadida et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0075048 A1 | 3/2014 | Yuksel et al. |
| 2014/0075336 A1 | 3/2014 | Curtis et al. |
| 2014/0081596 A1 | 3/2014 | Agrawal et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0108665 A1 | 4/2014 | Arora et al. |
| 2014/0115219 A1 | 4/2014 | Ajanovic et al. |
| 2014/0115403 A1 | 4/2014 | Rhee et al. |
| 2014/0115654 A1 | 4/2014 | Rogers et al. |
| 2014/0122656 A1 | 5/2014 | Baldwin et al. |
| 2014/0129942 A1 | 5/2014 | Rathod |
| 2014/0130039 A1 | 5/2014 | Chaplik et al. |
| 2014/0136680 A1 | 5/2014 | Joshi et al. |
| 2014/0137109 A1 | 5/2014 | Sharma et al. |
| 2014/0137180 A1 | 5/2014 | Lukacs et al. |
| 2014/0140213 A1* | 5/2014 | Raleigh ................ H04L 43/062 370/235 |
| 2014/0140244 A1 | 5/2014 | Kapadia et al. |
| 2014/0141524 A1 | 5/2014 | Keith |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0173723 A1 | 6/2014 | Singla et al. |
| 2014/0192639 A1 | 7/2014 | Smirnov |
| 2014/0201717 A1 | 7/2014 | Mascaro et al. |
| 2014/0201838 A1 | 7/2014 | Varsanyi et al. |
| 2014/0208296 A1 | 7/2014 | Dang et al. |
| 2014/0210616 A1 | 7/2014 | Ramachandran |
| 2014/0215443 A1 | 7/2014 | Voccio et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0230062 A1 | 8/2014 | Kumaran |
| 2014/0233387 A1 | 8/2014 | Zheng et al. |
| 2014/0247206 A1 | 9/2014 | Grokop et al. |

(56) References Cited

U.S. PATENT DOCUMENTS

| | | |
|---|---|---|
| 2014/0258310 A1 | 9/2014 | Wong et al. |
| 2014/0269777 A1 | 9/2014 | Rothstein et al. |
| 2014/0280499 A1 | 9/2014 | Basavaiah et al. |
| 2014/0280892 A1 | 9/2014 | Reynolds et al. |
| 2014/0280908 A1 | 9/2014 | Rothstein et al. |
| 2014/0281030 A1 | 9/2014 | Cui et al. |
| 2014/0286174 A1 | 9/2014 | Iizuka et al. |
| 2014/0286354 A1 | 9/2014 | Van De Poel et al. |
| 2014/0289418 A1 | 9/2014 | Cohen et al. |
| 2014/0289854 A1 | 9/2014 | Mahvi |
| 2014/0297357 A1 | 10/2014 | Zeng et al. |
| 2014/0298461 A1 | 10/2014 | Hohndel et al. |
| 2014/0301213 A1 | 10/2014 | Khanal et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0321290 A1 | 10/2014 | Jin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1* | 11/2014 | Porras .................. H04L 63/20 726/1 |
| 2014/0331304 A1 | 11/2014 | Wong |
| 2014/0344438 A1 | 11/2014 | Chen et al. |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2014/0363076 A1 | 12/2014 | Han et al. |
| 2014/0376379 A1 | 12/2014 | Fredette et al. |
| 2015/0006689 A1 | 1/2015 | Szilagyi et al. |
| 2015/0006714 A1 | 1/2015 | Jain |
| 2015/0007317 A1 | 1/2015 | Jain |
| 2015/0009840 A1 | 1/2015 | Pruthi et al. |
| 2015/0019140 A1 | 1/2015 | Downey et al. |
| 2015/0019569 A1 | 1/2015 | Parker et al. |
| 2015/0023170 A1 | 1/2015 | Kakadia et al. |
| 2015/0026794 A1 | 1/2015 | Zuk et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0039757 A1 | 2/2015 | Petersen et al. |
| 2015/0043351 A1 | 2/2015 | Ohkawa et al. |
| 2015/0046882 A1 | 2/2015 | Menyhart et al. |
| 2015/0047032 A1 | 2/2015 | Hannis et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0089614 A1 | 3/2015 | Mathew et al. |
| 2015/0095332 A1 | 4/2015 | Beisiegel et al. |
| 2015/0112933 A1 | 4/2015 | Satapathy |
| 2015/0113063 A1 | 4/2015 | Liu et al. |
| 2015/0113133 A1 | 4/2015 | Srinivas et al. |
| 2015/0117624 A1 | 4/2015 | Rosenshine |
| 2015/0124608 A1 | 5/2015 | Agarwal et al. |
| 2015/0124652 A1 | 5/2015 | Dharmapurikar et al. |
| 2015/0128133 A1 | 5/2015 | Pohlmann |
| 2015/0128205 A1 | 5/2015 | Mahaffey et al. |
| 2015/0128246 A1 | 5/2015 | Feghali et al. |
| 2015/0134801 A1 | 5/2015 | Walley et al. |
| 2015/0138993 A1 | 5/2015 | Forster et al. |
| 2015/0142962 A1 | 5/2015 | Srinivas et al. |
| 2015/0147973 A1 | 5/2015 | Williams et al. |
| 2015/0156118 A1 | 6/2015 | Madani et al. |
| 2015/0170213 A1 | 6/2015 | O'Malley |
| 2015/0195291 A1 | 7/2015 | Zuk et al. |
| 2015/0199254 A1 | 7/2015 | Vesepogu et al. |
| 2015/0215334 A1 | 7/2015 | Bingham et al. |
| 2015/0222516 A1 | 8/2015 | Deval et al. |
| 2015/0222939 A1 | 8/2015 | Gallant et al. |
| 2015/0227396 A1 | 8/2015 | Nimmagadda et al. |
| 2015/0227598 A1 | 8/2015 | Hahn et al. |
| 2015/0244617 A1 | 8/2015 | Nakil et al. |
| 2015/0244739 A1 | 8/2015 | Ben-Shalom et al. |
| 2015/0245248 A1 | 8/2015 | Shudark et al. |
| 2015/0249622 A1 | 9/2015 | Phillips et al. |
| 2015/0254330 A1 | 9/2015 | Chan et al. |
| 2015/0256413 A1 | 9/2015 | Du et al. |
| 2015/0256555 A1 | 9/2015 | Choi et al. |
| 2015/0256587 A1 | 9/2015 | Walker et al. |
| 2015/0261842 A1 | 9/2015 | Huang et al. |
| 2015/0261886 A1 | 9/2015 | Wu et al. |
| 2015/0261887 A1 | 9/2015 | Joukov |
| 2015/0271008 A1 | 9/2015 | Jain et al. |
| 2015/0271255 A1 | 9/2015 | Mackay et al. |
| 2015/0278273 A1 | 10/2015 | Wigington et al. |
| 2015/0281116 A1 | 10/2015 | Ko et al. |
| 2015/0281277 A1 | 10/2015 | May et al. |
| 2015/0281407 A1 | 10/2015 | Raju et al. |
| 2015/0294212 A1 | 10/2015 | Fein |
| 2015/0295945 A1 | 10/2015 | Canzanese, Jr. et al. |
| 2015/0304346 A1 | 10/2015 | Kim |
| 2015/0312233 A1 | 10/2015 | Graham, III et al. |
| 2015/0336016 A1 | 11/2015 | Chaturvedi |
| 2015/0341376 A1 | 11/2015 | Nandy et al. |
| 2015/0341379 A1 | 11/2015 | Lefebvre et al. |
| 2015/0341383 A1 | 11/2015 | Reddy et al. |
| 2015/0347554 A1 | 12/2015 | Vasantham et al. |
| 2015/0356297 A1 | 12/2015 | Guri et al. |
| 2015/0358287 A1 | 12/2015 | Caputo, II et al. |
| 2015/0358352 A1 | 12/2015 | Chasin et al. |
| 2015/0379278 A1 | 12/2015 | Thota et al. |
| 2015/0381409 A1 | 12/2015 | Margalit et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0028605 A1 | 1/2016 | Gil et al. |
| 2016/0030683 A1 | 2/2016 | Taylor et al. |
| 2016/0034560 A1 | 2/2016 | Setayesh et al. |
| 2016/0035787 A1 | 2/2016 | Matsuda |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0036838 A1 | 2/2016 | Jain et al. |
| 2016/0050128 A1 | 2/2016 | Schaible et al. |
| 2016/0050132 A1 | 2/2016 | Zhang |
| 2016/0072638 A1 | 3/2016 | Amer et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0094657 A1 | 3/2016 | Vieira et al. |
| 2016/0094994 A1 | 3/2016 | Kirkby et al. |
| 2016/0103692 A1 | 4/2016 | Guntaka et al. |
| 2016/0105333 A1 | 4/2016 | Lenglet et al. |
| 2016/0105350 A1 | 4/2016 | Greifeneder et al. |
| 2016/0112269 A1 | 4/2016 | Singh et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0150060 A1 | 5/2016 | Meng et al. |
| 2016/0156531 A1 | 6/2016 | Cartwright et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191362 A1 | 6/2016 | Hwang et al. |
| 2016/0191466 A1* | 6/2016 | Pernicha ............... H04L 63/20 726/1 |
| 2016/0191469 A1 | 6/2016 | Zatko et al. |
| 2016/0191476 A1 | 6/2016 | Schutz et al. |

(56) References Cited

U.S. PATENT DOCUMENTS

| | | |
|---|---|---|
| 2016/0196374 A1 | 7/2016 | Bar et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0218933 A1 | 7/2016 | Porras et al. |
| 2016/0234083 A1 | 8/2016 | Ahn et al. |
| 2016/0248794 A1 | 8/2016 | Cam |
| 2016/0248813 A1 | 8/2016 | Byrnes |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0277272 A1 | 9/2016 | Peach et al. |
| 2016/0277435 A1 | 9/2016 | Salajegheh et al. |
| 2016/0283307 A1 | 9/2016 | Takeshima et al. |
| 2016/0285730 A1 | 9/2016 | Ohkawa et al. |
| 2016/0292065 A1 | 10/2016 | Thangamani et al. |
| 2016/0294691 A1 | 10/2016 | Joshi |
| 2016/0306550 A1 | 10/2016 | Liu et al. |
| 2016/0308908 A1 | 10/2016 | Kirby et al. |
| 2016/0321452 A1 | 11/2016 | Richardson et al. |
| 2016/0321455 A1 | 11/2016 | Deng et al. |
| 2016/0330097 A1 | 11/2016 | Kim et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parandehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0378978 A1 | 12/2016 | Singla et al. |
| 2016/0380865 A1 | 12/2016 | Dubal et al. |
| 2016/0380869 A1 | 12/2016 | Shen et al. |
| 2017/0006141 A1 | 1/2017 | Bhadra |
| 2017/0024453 A1 | 1/2017 | Raja et al. |
| 2017/0032122 A1 | 2/2017 | Thakar et al. |
| 2017/0032310 A1 | 2/2017 | Mimnaugh |
| 2017/0034018 A1 | 2/2017 | Parandehgheibi et al. |
| 2017/0048121 A1 | 2/2017 | Hobbs et al. |
| 2017/0054643 A1 | 2/2017 | Fraser |
| 2017/0059353 A1 | 3/2017 | Madine et al. |
| 2017/0070582 A1 | 3/2017 | Desai et al. |
| 2017/0075710 A1 | 3/2017 | Prasad et al. |
| 2017/0085483 A1 | 3/2017 | Mihaly et al. |
| 2017/0091204 A1 | 3/2017 | Minwalla et al. |
| 2017/0093910 A1 | 3/2017 | Gukal et al. |
| 2017/0118244 A1 | 4/2017 | Bai et al. |
| 2017/0163502 A1 | 6/2017 | MacNeil et al. |
| 2017/0187733 A1 | 6/2017 | Ahn et al. |
| 2017/0201448 A1 | 7/2017 | Deval et al. |
| 2017/0208487 A1 | 7/2017 | Ratakonda et al. |
| 2017/0214708 A1 | 7/2017 | Gukal et al. |
| 2017/0222909 A1 | 8/2017 | Sadana et al. |
| 2017/0223052 A1 | 8/2017 | Stutz |
| 2017/0250880 A1 | 8/2017 | Akens et al. |
| 2017/0250951 A1 | 8/2017 | Wang et al. |
| 2017/0257424 A1 | 9/2017 | Neogi et al. |
| 2017/0284839 A1 | 10/2017 | Ojala |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0324518 A1 | 11/2017 | Meng et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0005427 A1 | 1/2018 | Marvie et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0032905 A1 | 2/2018 | Abercrombie |
| 2018/0098123 A1 | 4/2018 | Larson et al. |
| 2018/0145906 A1 | 5/2018 | Yadav et al. |
| 2018/0191617 A1 | 7/2018 | Caulfield et al. |
| 2020/0225110 A1 | 7/2020 | Knauss et al. |
| 2020/0273040 A1 | 8/2020 | Novick et al. |
| 2020/0279055 A1 | 9/2020 | Nambiar et al. |
| 2020/0396129 A1 | 12/2020 | Tedaldi et al. |
| 2022/0141103 A1 | 5/2022 | Gandham et al. |

FOREIGN PATENT DOCUMENTS

| | | |
|---|---|---|
| CN | 101667935 A | 3/2010 |
| CN | 101770551 A | 7/2010 |
| CN | 102142009 A | 8/2011 |
| CN | 102204170 A | 9/2011 |
| CN | 102521537 A | 6/2012 |
| CN | 103023970 A | 4/2013 |
| CN | 103699664 A | 4/2014 |
| CN | 103716137 A | 4/2014 |
| CN | 104065518 A | 9/2014 |
| CN | 107196807 A | 9/2017 |
| EP | 1039690 A2 | 9/2000 |
| EP | 1069741 A1 | 1/2001 |
| EP | 1076848 B1 | 7/2002 |
| EP | 1383261 A1 | 1/2004 |
| EP | 1450511 A1 | 8/2004 |
| EP | 2043320 A1 | 4/2009 |
| EP | 2045974 A1 | 4/2009 |
| EP | 2427022 A1 | 3/2012 |
| EP | 2723034 A1 | 4/2014 |
| EP | 2860912 A1 | 4/2015 |
| EP | 2887595 A1 | 6/2015 |
| EP | 3069241 B1 | 8/2018 |
| EP | 3793166 A1 | 3/2021 |
| JP | 2009016906 A | 1/2009 |
| KR | 101394338 B1 | 5/2014 |
| WO | 0145370 A1 | 6/2001 |
| WO | 2006045793 A1 | 5/2006 |
| WO | 2007014314 A2 | 2/2007 |
| WO | 2007042171 A1 | 4/2007 |
| WO | 2007139842 A2 | 12/2007 |
| WO | 2008069439 A1 | 6/2008 |
| WO | 2010048693 A1 | 5/2010 |

(56) References Cited

FOREIGN PATENT DOCUMENTS

| WO | 2010059972 A2 | 5/2010 |
|---|---|---|
| WO | 2012139288 A1 | 10/2012 |
| WO | 2012162419 A2 | 11/2012 |
| WO | 2013030830 A1 | 3/2013 |
| WO | 2013055812 A1 | 4/2013 |
| WO | 2013126759 A2 | 8/2013 |
| WO | 2014127008 A1 | 8/2014 |
| WO | 2015042171 A1 | 3/2015 |
| WO | 2015118454 A1 | 8/2015 |
| WO | 2016004075 A1 | 1/2016 |
| WO | 2016019523 A1 | 2/2016 |

OTHER PUBLICATIONS

Liu T., et al., "Impala: A Middleware System for Managing Autonomic, Parallel Sensor Systems," In Proceedings of the Ninth ACM SIGPLAN Symposium on Principles and Practice of Parallel Programming, ACM, New York, United States of America, Jun. 11-13, 2003, 12 Pages.
Lorenzo G.D., et al., "EXSED: An Intelligent Tool for Exploration of Social Events Dynamics from Augmented Trajectories," IEEE 14th International Conference on Mobile Data Management (MDM), Jun. 3-6, 2013, vol. 1, pp. 323-330.
Lu Z., et al., "Cluster-based Simulated Annealing for Mapping Cores onto 2D Mesh Networks on Chip," IEEE Workshop on Design and Diagnostics of Electronic Circuits and Systems, Apr. 16-18, 2008, 6 Pages.
Matteson R., "DEPMAP: Dependency Mapping of Applications Using Operating System Events," A Thesis, Master's Thesis, California Polytechnic State University, Dec. 2010, 115 pages.
Merriam-Webster, "Definition of Database," Merriam-Webster Dictionary, 2018, 4 Pages.
Miller N., et al., "Collecting Network Status Information for Network-Aware Applications," International Conference on Computer Communications IEEE (INFOCOM), 2000, pp. 1-10.
Moe J., et al., "Understanding Distributed Systems via Execution Trace Data," Proceedings of the 9th International Workshop on Program Comprehension, Toronto, Canada, May 12-13, 2001, 8 Pages.
Nagarajan R., et al., "Approximation Techniques for Computing Packet Loss in Finite-buffered Voice Multiplexers," IEEE Journal on Selected Areas in Communications, Apr. 1991, vol. 9, No. 3, pp. 368-377.
Natarajan A., et al., "NSDMiner: Automated Discovery of Network Service Dependencies," Proceedings IEEE INFOCOM, Orlando, FL, 2012, 9 Pages.
Navaz A.S.S., et al., "Entropy Based Anomaly Detection System to Prevent DDoS Attacks in Cloud," International Journal of Computer Applications (0975-8887), Jan. 2013, vol. 62, No. 15, pp. 42-47.
Neverfail, "Neverfail IT Continuity Architect," 2015, 6 Pages, Retrieved on [Apr. 22, 2016], Retrieved from the Internet: URL: https://web.archive.org/web/20150908090456/ http://www.neverfallgroup.com/products/it-continuity-architect.
Nilsson D.K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Notification Concerning Transmittal of International Preliminary Report on Patentability for International Application No. PCT/US2016/035348, mailed Dec. 14, 2017, 7 pages.
Notification Concerning Transmittal of International Preliminary Report on Patentability for International Application No. PCT/US2016/035349, mailed Dec. 14, 2017, 7 pages.
Notification Concerning Transmittal of International Preliminary Report on Patentability for International Application No. PCT/US2016/035350, mailed Dec. 14, 2017, 11 pages.
Notification Concerning Transmittal of International Preliminary Report on Patentability for International Application No. PCT/US2016/035351, mailed Dec. 14, 2017, 11 pages.
Nunnally T., et al., "P3D: A Parallel 3D Coordinate Visualization for Advanced Network Scans," IEEE International Conference on Communications (ICC), Jun. 9-13, 2013, pp. 1-6, Retrieved from the Internet: URL: www2.ece.gatech.edu.
O'Donnell G., et al., "The CMDB Imperative: How to Realize the Dream and Avoid the Nightmares," Chapter 4, The Federated CMS Architecture, Prentice Hall, Feb. 19, 2009, 44 pages.
Ohta K., et al., "Detection, Defense, and Tracking of Internet-Wide Illegal Access in a Distributed Manner," 2000, 16 pages, [Retrieved on May 9, 2016], Retrieved from Internet: URL: https://www.isoc.org/inet2000/cdproceedings/1f/1f_2.htm.
Online Collins English Dictionary: "Precede Definition and Meaning," 1 Page, [Retrieved on Apr. 9, 2018].
Opentracing IO, "The OpenTracing Semantic Specification," 8 pages, Retrieved on Jul. 5, 2023, from URL: https://opentracing.io/docs/.
Pathway Systems International Inc., "How Blueprints does Integration," Apr. 15, 2014, 9 Pages, [Retrieved on Apr. 27, 2016], Retrieved from the Internet: URL: http://pathwaysystems.com/company-blog/.
Pathway Systems International Inc., "What is Blueprints?," 2010-2016, 1 Page, [Retrieved on Apr. 27, 2016], Retrieved from the Internet: URL: http://pathwavsystems.com/blueprints-about/.
Popa L., et al., "Macroscope: End-Point Approach to Networked Application Dependency Discovery," CoNEXT'09, Dec. 1-4, 2009, Rome, Italy, 12 pages.
Prasad K.M., et al., "An Efficient Detection of Flooding Attacks to Internet Threat Monitors (ITM) using Entropy Variations under Low Traffic," Computing Communication & Networking Technologies (ICCCNT 12), Jul. 26-28, 2012, 11 Pages.
Sachan M., et al., "Solving Electrical Networks to Incorporate Supervision in Random Walks," In Proceedings of the 22nd International Conference on World Wide Web Companion (WWW '13 Companion), International World Wide Web Conferences Steering Committee, Republic and Canton of Geneva, Switzerland, May 13-17, 2013, pp. 109-110.
Sammarco M., et al., "Trace Selection for Improved WLAN Monitoring," In Proceedings of the 5th ACM Workshop on HotPlanet (HotPlanet '13), ACM, New York, NY, USA, Aug. 16, 2013, pp. 9-14.
Sandholm T., et al., "MapReduce Optimization Using Regulated Dynamic Prioritization," ACM, Jun. 15-19, 2009, pp. 299-310.
Sardella A., "Securing Service Provider Networks: Protecting Infrastructure and Managing Customer Security," Juniper Networks, Inc., White Paper, Dec. 2006, pp. 1-19.
Senel F., et al., "Optimized Interconnection of Disjoint Wireless Sensor Network Segments Using K Mobile Data Collectors," IEEE International Conference on Communications (ICC), Jun. 2012, pp. 497-501.
Sherri S., et al., "A Chipset Level Network Backdoor: Bypassing Host-Based Firewall & IDS," ACM 2009, pp. 125-134.
Shneiderman B., "Network Visualization by Semantic Substrates," Visualization and Computer Graphics, IEEE Transactions on Visualization and Computer Graphics, Sep./Oct. 2006, vol. 12 (5), pp. 733-740.
Sigelman B.H., et al., "Dapper, A Large-Scale Distributed Systems Tracing Infrastructure," Google Technical Report dapper-2010-1, Apr. 2010, 14 Pages, Retrieved from the Internet: URL: https://research.google/pubs/pub36356/.
Templeton S.J., et al., "Detecting Spoofed Packets," IEEE, Proceedings of the DARPA Information Survivability Conference and Exposition (DISCEX'03), 2003, pp. 1-12.
Theodorakopoulos G., et al., "On Trust Models and Trust Evaluation Metrics for Ad Hoc Networks," IEEE Journal on Selected Areas in Communications, Feb. 2006, vol. 24, No. 2, pp. 318-328.
Thomas R., "Bogon Dotted Decimal List," Version 7.0, Team Cymru NOC, Apr. 27, 2012, 5 Pages.
"Top 4 Strategies to Mitigate Targeted Cyber Intrusions," Cyber Security Operations Centre, Australian Government Department of

(56) References Cited

OTHER PUBLICATIONS

Defence, Intelligence and Security, Jul. 2013, Retrieved from URL: http://www.asd.aov.au/infosec/tom-mitiqations/top-4-strateqies-exolained.html, 42 Pages.

Voris J., et al., "Bait and Snitch: Defending Computer Systems with Decoys," Columbia University Libraries, Department of Computer Science, 2013, 25 pages.

Wang J.Y., et al., "Continuous Data Collection in Wireless Sensor Networks through PNC and Distributed Storage", 2007 International Conference on Wireless Communications, Networking and Mobile Computing, 2007, pp. 2568-2571.

Wang R., et al., "Learning Directed Acyclic Graphs via Bootstrap Aggregating," Jun. 9, 2014, 47 pages, Retrieved from Internet: URL: http://arxiv.org/abs/1406.2098.

Wang Y., et al., "A Network Gene-Based Framework for Detecting Advanced Persistent Threats," 2014 Ninth International Conference on P2P, Parallel, Grid, Cloud and Internet Computing, Nov. 2014, IEEE, pp. 97-102.

Witze A., "Special Relativity Aces Time Trial, Time Dilation Predicted by Einstein Confirmed by Lithium Ion Experiment," Nature, Sep. 19, 2014, 3 Pages.

Woodberg B., "Snippet from Juniper SRX Series," O'Reilly Media, Inc, Rob Cameron Publisher, Jun. 17, 2013, 1 page.

Zatrochova B.Z., "Analysis and Testing of Distributed NoSQL Datastore Riak," Brno, May 28, 2015, 2 Pages.

Zatrochova B.Z., "Analysis and Testing of Distributed NoSQL Datastore Riak," Masaryk University, Faculty of Informatics, Brno, Spring, 2015, 76 Pages.

Zeng S., et al., "Managing Risk in Multi-node Automation of Endpoint Management," IEEE Network Operations and Management Symposium (NOMS), 2014, 6 Pages, Retrieved from URL: https://ieeexplore.ieee.org/stamp/stamp.jsp?tp=&arnumber=6838295.

Zhang D., et al., "Packet Loss Measurement and Control for VPN based Services," Proceedings of IEEE Instrumentation and Measurement Technology Conference, May 17-19, 2005, vol. 3, 5 Pages.

Zhang Y., et al., "CANTINA: A Content-Based Approach to Detecting Phishing Web Sites," May 8-12, 2007, pp. 639-648.

Crisan D., et al., "Datacenter Applications in Virtualized Networks: A Cross-Layer Performance Study", IEEE Journal on Selected Areas in Communications, vol. 32, No. 1, Retrieved on Oct. 1, 2023, Published on Jan. 1, 2014, pp. 77-87.

De Carvalho T.F.R., "Root Cause Analysis in Large and Complex Networks," Mestrado Em Seguranca Informatica, Dec. 2008, 66 Pages.

Diaz J.M., et al., "A Simple Closed-Form Approximation for the Packet Loss Rate of a TCP Connection Over Wireless Links," IEEE Communications Letters, Sep. 2014, vol. 18, No. 9, 4 Pages.

Duan Y., et al., "Detective: Automatically Identify and Analyze Malware Processes in Forensic Scenarios via DLLs," IEEE ICC—Next Generation Networking Symposium, 2015, pp. 5691-5696.

"Effective use of Reputation Intelligence in a Security Operations Center: Tailoring HP Reputation Security Monitor to your Needs," HP Technical White Paper, Copyright, Jul. 2013, Rev. 1, pp. 1-6.

European Search Report in European Patent Application No. 23176492.9, dated Oct. 6, 2023, 5 Pages.

Extended European Search Report for European Application No. 19215055.5, mailed Jan. 17, 2020, 9 Pages.

Extended European Search Report for European Application No. 20165008.2, mailed May 25, 2020, 6 pages.

Extended European Search Report for European Application No. 21150804.9, mailed May 6, 2021, 8 Pages.

Extended European Search Report for European Application No. 21156151.9, mailed May 25, 2021, 8 pages.

Extended European Search Report for European Application No. 21190461.0, mailed Mar. 1, 2022, 10 Pages.

Feinstein L., et al., "Statistical Approaches to DDoS Attack Detection and Response," Proceedings of the DARPA Information Survivability Conference and Exposition, Apr. 22-24, 2003, vol. 1, pp. 303-314.

Foundation for Intelligent Physical Agents, "FIPA Agent Message Transport Service Specification," Dec. 3, 2002, 15 Pages, Retrieved from the Internet: URL: http://www.fiDa.org.

George A., et al., "NetPal: A Dynamic Network Administration Knowledge Base," In proceedings of the 2008 Conference of the Center for Advanced Studies on Collaborative Research: Meeting of Minds (CASCON '08), Marsha Chechik, Mark Vigder, and Darlene Stewart Editions, ACM, NewYork, United States of America, Article 20, 2008, 14 Pages.

Gia T.N., et al., "Fog Computing in Healthcare Internet of Things: A Case Study on ECG Feature Extraction," IEEE International Conference on Computer and Information Technology, Ubiquitous Computing and Communications, Dependable, Autonomic and Secure Computing, Pervasive Intelligence and Computing, Oct. 26, 2015, pp. 356-363.

Github, "OpenTracing," 10 pages, Feb. 9, 2021, Retrieved on Jul. 5, 2023, from URL: https://github.com/opentracing/specification/blob/master/specification.md.

Goins A., et al., "Diving Deep into Kubernetes Networking," Rancher, Jan. 2019, 42 pages.

Goldsteen A., et al., "A Tool for Monitoring and Maintaining System Trustworthiness at RunTime," REFSQ, 2015, pp. 142-147.

Grove D., et al., "Call Graph Construction in Object-Oriented Languages," ACM Object-oriented Programming, Systems, Languages, and Applications—OOPSLA '97 Conference Proceedings, Oct. 1997, 18 pages.

Hamadi S., et al., "Fast Path Acceleration for Open vSwitch in Overlay Networks," Global Information Infrastructure and Networking Symposium (GIIS), Montreal, QC, Sep. 15-19, 2014, 5 pages.

Heckman S., et al., "On Establishing a Benchmark for Evaluating Static Analysis Alert Prioritization and Classification Techniques," IEEE, Oct. 9-10, 2008, 10 Pages.

Henke C., et al., "Evaluation of Header Field Entropy forHash-Based Packet Selection," based on Search String from Google: "entropy header fields," Obtained on: Nov. 12, 2019, Passive and Active Network Measurement—PAM, 2008, vol. 4979, pp. 82-91.

Hideshima Y., et al., "STARMINE: A Visualization System for Cyber Attacks," Australian Computer Society, Inc., Jan. 2006, Asia-Pacific Symposium on Information Visualization (APVIS 2006), Tokyo, Japan, Feb. 2006, pp. 1-9, Retrieved from the Internet: URL: htps://www.researchgate.net/publication/221536306.

Hogg S., "Not your Father's Flow Export Protocol (Part 2), What is AppFlow and how does it Differ From Other Flow Analysis Protocols?," Core Networking, Mar. 19, 2014, 6 pages.

Huang D-J., et al., "Clock Skew Based Node Identification in Wireless Sensor Networks," IEEE GLOBECOM, 2008, 5 Pages.

Ihler A., et al., "Learning to Detect Events With Markov-Modulated Poisson Processes," ACM Transactions on Knowledge Discovery From Data, Dec. 2007, vol. 1, No. 3, Article 13, pp. 13:1 to 13:23.

International Search Report and Written Opinion for International Application No. PCT/US2016/035348, mailed Jul. 27, 2016, 8 pages.

International Search Report and Written Opinion for International Application No. PCT/US2016/035349, mailed Jul. 27, 2016, 8 pages.

International Search Report and Written Opinion for International Application No. PCT/US2016/035350, mailed Aug. 17, 2016, 13 pages.

International Search Report and Written Opinion for International Application No. PCT/US2016/035351, mailed Aug. 10, 2016, 15 pages.

Internetperils, Inc., "Control Your Internet Business Risk," 2003-2015, 3 Pages, [Retrieved on Apr. 21, 2016], Retrieved from the Internet: URL: https://www.internetperils.com.

Ives H.E., et al., "An Experimental Study of the Rate of a Moving Atomic Clock," Journal of the Optical Society of America, Jul. 1938, vol. 28, No. 7, pp. 215-226.

(56) References Cited

OTHER PUBLICATIONS

Janoff, Christian, et al., "Cisco Compliance Solution for HIPAA Security Rule Design and Implementation Guide," Cisco Systems, Inc., Updated Nov. 14, 2015, 938 Pages.
Joseph D., et al., "Modeling Middleboxes," IEEE Network, Sep./Oct. 2008, pp. 20-25.
Juels A., "RFID Security and Privacy: A Research Survey," Feb. 2006, IEEE Journal on Selected Areas in Communications, vol. 24, No. 2, pp. 381-394.
Kalyanasundaram B., et al., "Using Mobile Data Collectors to Federate Clusters of Disjoint Sensor Network Segments," IEEE, International Conference on Communications, Department of Computer Science and Electrical Engineering, University of Maryland Baltimore County, 2013, pp. 1496-1500.
Kent S., et al., "Security Architecture for the Internet Protocol," Network Working Group, Nov. 1998, 67 Pages.
Kerrison A., et al., "Four Steps to Faster, Better Application Dependency Mapping—Laying the Foundation for Effective Business Service Models," BMCSoftware, 2011, 12 Pages.
Kim M-S., et al., "A Flow-based Method for Abnormal Network Traffic Detection," Institute of Electrical and Electronics Engineers—IEEE, 2004, pp. 599-612.
Kraemer B., "Get to Know Your Data Center with CMDB," TechTarget, [Retrieved on Apr. 19, 2016], Apr. 5, 2006, 3 pages, Retrieved from the Internet: URL: http://searchdatacenter.techtarget.com/news/1178820/Get-to-know-your-data-center-with-CMDB.
Kubernetes Blog, "Borg: The Predecessor to Kubernetes," Apr. 23, 2015, 2 pages, Retrieved from URL: https://kubernetes.io/blog/2015/04/borg-predecessor-to-kubernetes/.
Kubernetes IO, "Kubernetes Components," Aug. 28, 2020, 4 pages, Retrieved from URL: https://kubernetes.io/docs/concepts/overview/components/.
Kubernetes IO, "Nodes," Jan. 12, 2021, 6 pages, Retrieved from URL: https://kubernetes.io/docs/concepts/architecture/nodes/.
Kubernetes IO, "Pods," Jan. 12, 2021, 5 pages, Retrieved from URL: https://kubernetes.io.docs/concepts/workloads/pods/pod/.
Kubernetes IO, "What is Kubernetes?," Oct. 22, 2020, 3 pages, Retrieved from URL: https://kubernetes.io/docs/concepts/overview/what-is-kubernetes/.
Lab Sku: "VMware Hands-on Labs—HOL-SDC-1301," Lab Overview, 2013, [Version Mar. 21, 2014-Jul. 9, 2016] Retrieved from URL: http://docs.hol.vmware.com/HOL-2013/hol-sdc-1301_html_en/, Uploaded in 2 Parts, 118 Pages.
Lachance M., "Dirty Little Secrets of Application Dependency Mapping—www.itsmwatch.com," Dec. 26, 2007, 3 pages.
Landman Y., et al., "Dependency Analyzer," JFrog Wiki, Feb. 14, 2008, 1 Page, [Retrieved on Apr. 22, 2016] Retrieved from URL: http://frog.com/confluence/display/DA/Home.
Lee S., "Reducing Complexity of Large-Scale Network Configuration Management," Ph.D. Dissertation, Carniege Mellon University, Pittsburg, PA, May 2010, 200 Pages.
Li A., et al., "Fast Anomaly Detection for Large Data Centers," IEEE Global Telecommunications Conference (GLOBECOM), Dec. 2010, 6 Pages.
"A Cisco Guide to Defending Against Distributed Denial of Service Attacks," Cisco Systems Incorporated, San Jose, California, [Last Visited May 3, 2016] Retrieved from URL: http://www.cisco.com/web/about/security/intelligence/guide_ddos_defense.html, 34 Pages.
Al-Fuqaha A., et al., "Internet of Things: A Survey on Enabling Technologies, Protocols, and Applications," IEEE Communication Surveys & Tutorials, Fourth Quarter, Nov. 18, 2015, vol. 17, No. 4, pp. 2347-2376.
Ananthanarayanan R., et al., "Photon: Fault-tolerant and Scalable Joining of Continuous Data Streams," Proceedings of the ACM SIGMOD International Conference on Management of Data, New York, USA, Jun. 22-27, 2013, pp. 577-588.
Aniszczyk C., "Distributed Systems Tracing with Zipkin," Twitter Blog, Jun. 7, 2012, 3 Pages, [Retrieved on Jan. 26, 2021] Retrieved from URL: https://blog.twitter.com/engineering/en_us/a/2012/distributed-systems-tracing-with-zipkin.html.
Arista Networks, Inc., "Application Visibility and Network Telemtry Using Splunk," Arista White Paper, Nov. 2013, 9 Pages.
Author Unknown, "Blacklists & Dynamic Blacklists Reputation: Understanding Why the Evolving Threat Eludes Blacklists," Retrieved on Aug. 31, 2017, Dambala, Atlanta, GA 30308, USA, 9 Pages.
Aydin G., et al., "Architecture and Implementation of a Scalable Sensor Data Storage and Analysis System Using Cloud Computing and Big Data Technologies," Journal of Sensors, vol. 2015, Article 834217, Feb. 2015, 11 Pages.
Ayers A., et al., "TraceBack: First Fault Diagnosis by Reconstruction of Distributed Control Flow," Proceedings of the 2009 ACM SIGPLAN Conference on Programming Language Design and Implementation—PLDI '09, Jun. 12-15, 2005, vol. 40, No. 6, 13 pages.
Baah G.K., et al.,"The Probabilistic Program Dependence Graph and Its Application to Fault Diagnosis," IEEE Transactions on Software Engineering, IEEE Service Center, Los Alamitos, CA, US, Jul./Aug. 2010, vol. 36, No. 4, pp. 528-545, ISSN 0098-5589, XP011299543.
Backes M., et al., "Data Lineage in Malicious Environments," IEEE, 2015, pp. 1-13.
Baek K-H., et al., "Preventing Theft of Quality of Service on Open Platforms," Workshop of the 1st International Conference on Security and Privacy for Emerging Areas in Communication Networks, 2005, 12 Pages, Retrieved from URL: https://ieeexplore.ieee.org/stamp/stamp.jsp?tp=&arnumber=1588319.
Bayati M., et al., "Message-Passing Algorithms for Sparse Network Alignment," ACM Transactions on Knowledge Discovery from Data, vol. 7, No. 1, Article 3, Mar. 2013, 31 Pages.
Berezinski P., et al., "An Entropy-Based Network Anomaly Detection Method," Entropy, vol. 17, Apr. 20, 2015, Retrieved from URL: www.mdpi.com/journal/entropy, pp. 2367-2408.
Berthier R., et al., "Nfsight: Netflow-based Network Awareness Tool," In Proceedings of the 24th International Conference on Large Installation System Administration, USENIX Association, Berkeley, CA, USA, 2010, 16 Pages.
Bhuyan D., "Fighting Bots and Botnets," In Proceedings of the International Conference on i-Warfare and Security, Academic Conferences Limited, 2006, pp. 23-28.
Blair D., et al., U.S. Appl. No. 62/106,006, filed Jan. 21, 2015, entitled "Monitoring Network Policy Compliance," 22 Pages.
Bosch G., "Virtualization," Modified on Apr. 2010 by Davison B., 33 Pages.
Brahmi H.I., et al., "Improving Emergency Messages Transmission Delay in Road Monitoring Based WSNs," 6th Joint IFIP Wireless and Mobile Networking Conference (WMNC), 2013, 8 Pages, [Retrieved on Aug. 31, 2021].
Breen C., "MAC 911: How to Dismiss Mac App Store Notifications," Macworld, Mar. 24, 2014, 3 Pages.
Brocade Communications Systems, Inc., "Chapter 5 Configuring Virtual LANs (VLANs)," Jun. 2009, 38 pages.
Chandran M., et al., "Monitoring in a Virtualized Environment," GSTF International Journal on Computing, Aug. 2010, vol. 1, No. 1, 6 Pages.
Chari S., et al., "Ensuring Continuous Compliance Through Reconciling Policy with Usage," Proceedings of the 18th ACM Symposium on Access Control Models andTechnologies, NewYork, United States of America, Jun. 12-14, 2013, pp. 49-60.
Chen X., et al., "Automating Network Application Dependency Discovery: Experiences, Limitations, and New Solutions," 8th USENIX Symposium on Operating Systems Design and Implementation (OSDI'08), USENIX Association, Berkeley, California, United States of America, retrieved Aug. 30, 2017, pp. 117-130.
Choi C.H., et al., "CSMonitor: A Visual Client/Server Monitor for CORBA-based Distributed Applications," Proceedings of 1998 Asia Pacific Software Engineering Conference, Taipei, Taiwan, Los Alamitos, CA, USA, Dec. 2-4, 1998, 8 Pages, DOI: 10.1109/APSEC.1998.733738, ISBN 978-0-8186-9183-6, XP010314829.
Chou C.W., et al., "Optical Clocks and Relativity," Science, vol. 329, Sep. 24, 2010, pp. 1630-1633.

(56) References Cited

OTHER PUBLICATIONS

Cisco Systems, "Cisco Network Analysis Modules (NAM) Tutorial," Cisco Systems, Inc., Version: 3.5, Accessed web page Oct. 13, 2015, 2006, 320 pages.
Cisco Systems Inc: "Addressing Compliance from One Infrastructure: Cisco Unified Compliance Solution Framework," 2014, 3 Pages.
Cisco Systems, Inc., "CCNA2 v3.1 Module 1 WANs and Routers," Cisco.com, May 14, 2018, 26 pages.
Cisco Systems, Inc., "CCNA2 v3.1 Module 2 Introduction to Routers," Cisco.com, Jan. 18, 2018, 23 pages.
Cisco Systems Inc: "Cisco 4710 Application Control Engine Appliance Hardware Installation Guide," Nov. 2007, 66 Pages.
Cisco Systems, Inc., "Cisco Application Control Engine (ACE) Troubleshooting Guide—Understanding the ACE Module Architecture and Traffic Flow," Mar. 11, 2011, 6 Pages.
Cisco Systems, Inc., "Cisco Application Dependency Mapping Service," Data Sheet, 2009, 5 pages.
Cisco Systems Inc: "Cisco Application Visibility and Control," At-A-Glance, Oct. 2011, 2 Pages.
Cisco Systems Inc: "Cisco Data Center Network Architecture and Solutions Overview," Feb. 2006, 19 Pages.
Cisco Systems, Inc., "Cisco IOS Configuration Fundamentals Configuration Guide: Using Autoinstall and Setup," Release 12.2, first published Apr. 2001, last updated Sep. 2003, 32 pages.
Cisco Systems Inc: "Cisco, Nexus 3000 Series NX-OS Release Notes, Release 5.0(3)U3(1)," Feb. 29, 2012, 16 Pages, Part No. OL-26631-01.
Cisco Systems, Inc., "Cisco, Nexus 5000 Series and Cisco Nexus 2000 Series Release Notes, Cisco NX-OS Release 5.1 (3)N2(1b), NX-OS Release 5.1(3)N2(1a) and NX-OS Release 5.1 (3)N2(1)," Sep. 5, 2012, Part No. OL-26652-03 CO, Current Release: NX-OS Release 5.1(3)N2(1b), 24 pages.
Cisco Systems Inc: "Cisco Remote Integrated Service Engine for Citrix NetScaler Appliances and Cisco Nexus 7000 Series Switches Configuration Guide," Last modified Apr. 29, 2014, 78 Pages.
Cisco Systems Inc., "Cisco Tetration Platform Data Sheet," Cisco, Updated Mar. 5, 2018, 21 Pages.
Cisco Systems, Inc., "Cisco VN-Link: Virtualization-Aware Networking," A Technical Primer, 2009, 9 Pages.
Cisco Systems, Inc., "Cisco VPN Client User Guide for Windows," Release 4.6, Aug. 2004, 148 pages.
Cisco Systems Inc: "New Cisco Technologies Help Customers Achieve Regulatory Compliance," White Paper, 1992-2008, retrieved on Aug. 31, 2017, 9 Pages.
Cisco Systems Inc: "Nexus 3000 Series NX-OS Fundamentals Configuration Guide, Release 5.0(3)U3(1): Using PowerOn Auto Provisioning," Feb. 29, 2012, 10 Pages, Part No. OL-26544-01.
Cisco Systems Inc: "Quick Start Guide, Cisco ACE 4700 Series Application Control Engine Appliance," Software Version A5(1.0), Sep. 2011, 138 Pages.
Cisco Systems Inc: "Routing and Bridging Guide, Cisco ACE Application Control Engine," Software Version A5 (1.0), Sep. 2011, 248 Pages.
Cisco Systems, Inc., "VMWare and Cisco Virtualization Solution: Scale Virtual Machine Networking," Jul. 2009, pp. 1-4.
Cisco Technology Inc: "Cisco IOS Software Release 12.4T Features and Hardware Support," Feb. 2009, 174 Pages, Retrieved from URL: http://www.cisco.com/c/en/us/Qroducts/collateralhos-nx-os-softwarehossoftware-releases-12-4-t/product bulletin_c25-409474.html.
Cisco Technology Inc., "Lock-and-Key: Dynamic Access Lists," Updated Jul. 12, 2006, Retrieved from URL: http://www/cisco.com/c/en/us/suppor/docs/security-ypn/lock-key/7604-13.html, 16 Pages.
Citirx, "AppFlow: Next-Generation Application Performance Monitoring," Citirx.com, 2011, pp. 1-8.
Costa R., et al., "An Intelligent Alarm Management System for Large-Scale Telecommunication Companies," In Portuguese Conference on Artificial Intelligence, Oct. 2009, 14 Pages, Retrieved from the Internet: URL: https://repositorium.sdum.uminho.Pt/bitstream/1822/11357/1/154-2.pdf.
Suo K., et al., "vNetTracer: Efficient and Programmable Packet Tracing in Virtualized Networks", 2018 IEEE 38th International Conference on Distributed Computing Systems (ICDCS), Jul. 2-6, 2018, pp. 165-175.
Office Action for European Application No. 21156151.9, dated May 7, 2024, 8 Pages.

\* cited by examiner

Policy Table 300

| Policy 301 | Source 304 | Destination 308 | Action 316 | Policy Use Count 318 |
|---|---|---|---|---|
| 301a | 192.168.1.3 | Geo: France | Allow | 2 |
| 301b | Endpoint Group 2 | 3,4,5 | Block | 234 |
| 301c | MAC: 01-23-45-67-89-ab | 2 | Allow | 45 |
| 301d | BIOS_ID: 3240 | User: John | Allow | 82 |
| 301e | Any | PID: Updater.exe | Throttle | 1004 |
| 301f | Any | Any | Block | 3234 |

FIG. 3

POLICY UTILIZATION ANALYSIS

CROSS-REFERENCE TO RELATED APPLICATIONS

This application is a continuation of U.S. Non-Provisional patent application Ser. No. 17/153,785, filed Jan. 20, 2021, which in turn is a continuation of U.S. Non-Provisional patent application Ser. No. 15/045,202, filed Feb. 16, 2016, now U.S. Pat. No. 10,904,116, issued Jan. 26, 2021, which claims the benefit of U.S. Provisional Patent Application No. 62/171,899, filed Jun. 5, 2015, the full disclosures of which are incorporated herein by reference in their entireties.

TECHNICAL FIELD

The present technology pertains to network policy management and more specifically pertains to network policy management based on analysis of policy utilization.

BACKGROUND

A network flow is conventionally characterized as one or more packets sharing certain attributes that are sent within a network within a specified period of time. Packet attributes can include a network source address (e.g., Internet Protocol (IP) address, Media Access Control (MAC) address, Domain Name System (DNS) name, or other network address), source port, destination address, destination port, protocol type, class of service, among other characteristics. The network source address may correspond to a first endpoint (e.g., modem, hub, bridge, switch, router, server, workstation, desktop computer, laptop computer, tablet, mobile phone, desk phone, wearable device, or other network or electronic device) of the network, and the network destination address may correspond to a second endpoint of the network. Network flow data is conventionally collected when a switch or a router forwards a packet, and thus, a switch or router interface can also be a packet attribute used to distinguish network flows. Network policies can determine whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. Network administrators typically create these policies and configure network devices to enforce them. Over time, policies can accumulate and become difficult and burdensome for the administrators to manage.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3 shows an example policy table according to some embodiments;

DESCRIPTION OF EXAMPLE EMBODIMENTS

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network traffic monitoring system can determine the extent to which a network policy is utilized within a network. Understanding policy utilization can help network administrators and/or network management systems improve operation of the network. In an example embodiment, the network traffic monitoring system can continuously monitor network traffic. The network traffic monitoring system can determine one or more applicable policies for the network traffic and maintain statistics regarding those policies, such as a number of flows, number of packets, and/or number of bytes sent over a configurable time period associated with a particular policy that was enforced or failed to be enforced. The policy utilization statistics can be used to optimize ordering of policies in a policy table, remove unused policies, or provide insight to an analytics engine for recognizing threats to a network, network misconfiguration, or other harmful network traffic, among other possibilities.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for improved policy management and utilization detection in a data center.

Figure 1:
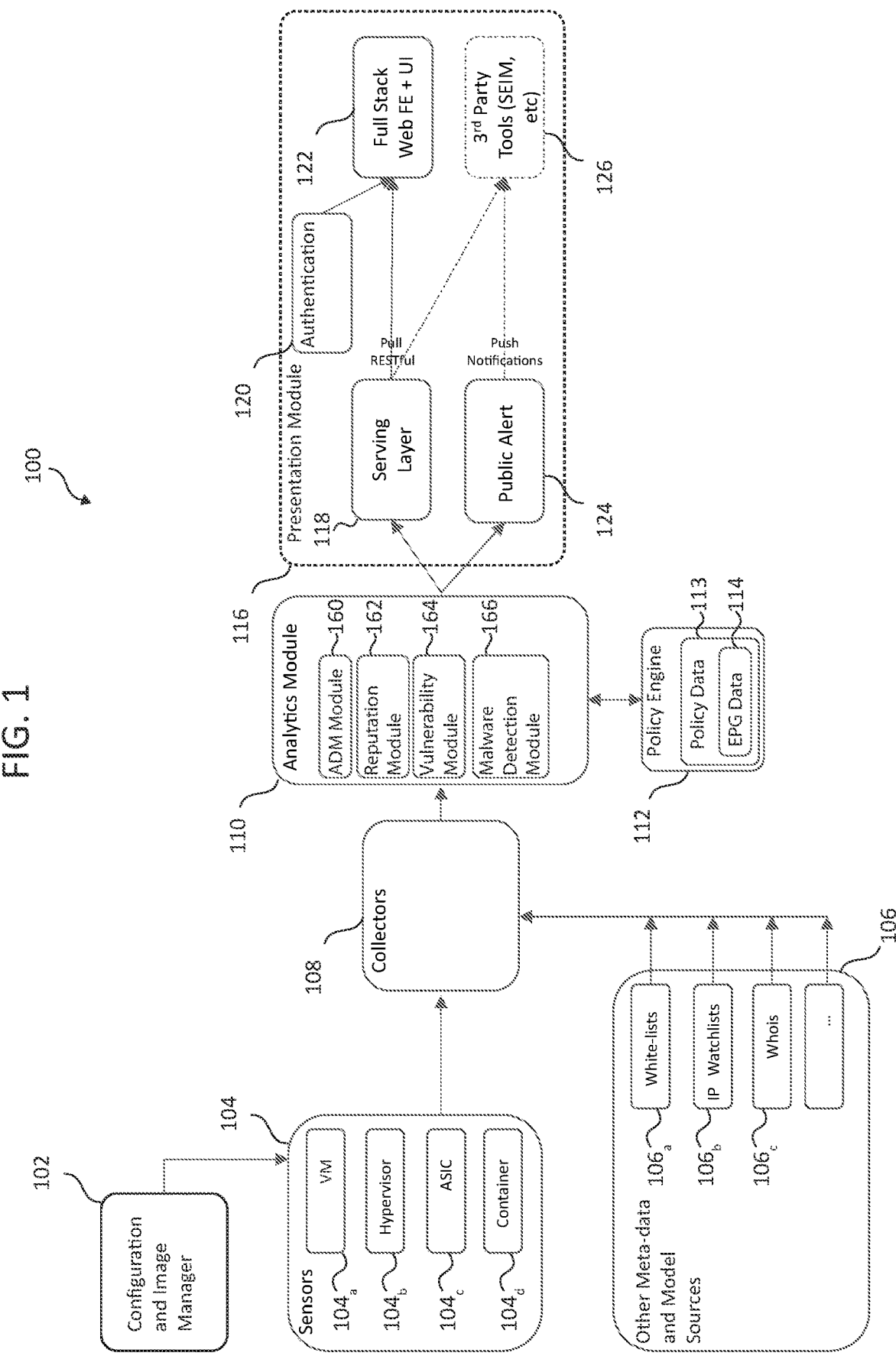
FIG. 1 shows an example network traffic monitoring system according to some embodiments.

FIG. 1 illustrates an example network traffic monitoring system 100 according to some example embodiments. Network traffic monitoring system 100 can include configuration and image manager 102, sensors 104, external data sources 106, collectors 108, analytics module 110, policy engine 112, and presentation module 116. These modules may be implemented as hardware and/or software components. Although FIG. 1 illustrates an example configuration of the various components of network traffic monitoring system 100, those of skill in the art will understand that the components of network traffic monitoring system 100 or any system described herein can be configured in a number of different ways and can include any other type and number of components. For example, sensors 104 and collectors 108 can belong to one hardware and/or software module or multiple separate modules. Other modules can also be combined into fewer components and/or further divided into more components.

Configuration and image manager 102 can provision and maintain sensors 104. In some example embodiments, sensors 104 can reside within virtual machine images, and configuration and image manager 102 can be the component that also provisions virtual machine images.

Configuration and image manager 102 can configure and manage sensors 104. When a new virtual machine is instantiated or when an existing one is migrated, configuration and image manager 102 can provision and configure a new sensor on the machine. In some example embodiments configuration and image manager 102 can monitor the health of sensors 104. For instance, configuration and image manager 102 may request status updates or initiate tests. In some example embodiments, configuration and image manager 102 can also manage and provision virtual machines.

In some example embodiments, configuration and image manager 102 can verify and validate sensors 104. For example, sensors 104 can be provisioned a unique ID that is created using a one-way hash function of its basic input/output system (BIOS) universally unique identifier (UUID) and a secret key stored on configuration and image manager 102. This UUID can be a large number that is difficult for an imposter sensor to guess. In some example embodiments, configuration and image manager 102 can keep sensors 104 up to date by installing new versions of their software and applying patches. Configuration and image manager 102 can obtain these updates automatically from a local source or the Internet.

Sensors 104 can reside on nodes of a data center network (e.g., virtual partition, hypervisor, physical server, switch, router, gateway, other network device, other electronic device, etc.). In general, a virtual partition may be an instance of a virtual machine (VM) (e.g., VM 104a), sandbox, container (e.g., container 104c), or any other isolated environment that can have software operating within it. The software may include an operating system and application software. For software running within a virtual partition, the virtual partition may appear to be a distinct physical server. In some example embodiments, a hypervisor (e.g., hypervisor 104b) may be a native or "bare metal" hypervisor that runs directly on hardware, but that may alternatively run under host software executing on hardware. Sensors 104 can monitor communications to and from the nodes and report on environmental data related to the nodes (e.g., node IDs, statuses, etc.). Sensors 104 can send their records over a high-speed connection to collectors 108 for storage. Sensors 104 can comprise a piece of software (e.g., running on a VM, container, virtual switch, hypervisor, physical server, or other device), an application-specific integrated circuit (ASIC) (e.g., a component of a switch, gateway, router, standalone packet monitor, or other network device including a packet capture (PCAP) module or similar technology), or an independent unit (e.g., a device connected to a network device's monitoring port or a device connected in series along a main trunk of a datacenter). It should be understood that various software and hardware configurations can be used as sensors 104. Sensors 104 can be lightweight, thereby minimally impeding normal traffic and compute resources in a datacenter. Sensors 104 can "sniff" packets being sent over its host network interface card (NIC) or individual processes can be configured to report traffic to sensors 104. This sensor structure allows for robust capture of granular (i.e., specific) network traffic data from each hop of data transmission.

As sensors 104 capture communications, they can continuously send network traffic data to collectors 108. The network traffic data can relate to a packet, a collection of packets, a flow, a group of flows, etc. The network traffic data can also include other details such as the VM BIOS ID, sensor ID, associated process ID, associated process name, process user name, sensor private key, geo-location of a sensor, environmental details, etc. The network traffic data can include information describing the communication on all layers of the Open Systems Interconnection (OSI) model. For example, the network traffic data can include signal strength (if applicable), source/destination MAC address, source/destination IP address, protocol, port number, encryption data, requesting process, a sample packet, etc.

In some example embodiments, sensors 104 can preprocess network traffic data before sending to collectors 108. For example, sensors 104 can remove extraneous or duplicative data or they can create a summary of the data (e.g., latency, packets and bytes sent per flow, flagged abnormal activity, etc.). In some example embodiments, sensors 104 can be configured to only capture certain types of connection information and disregard the rest. Because it can be overwhelming for a system to capture every packet in a network, in some example embodiments, sensors 104 can be configured to capture only a representative sample of packets (e.g., every 1,000th packet or other suitable sample rate).

Sensors 104 can send network traffic data to one or multiple collectors 108. In some example embodiments, sensors 104 can be assigned to a primary collector and a secondary collector. In other example embodiments, sensors 104 are not assigned a collector, but can determine an optimal collector through a discovery process. Sensors 104 can change where they send their network traffic data if their environments change, such as if a certain collector experiences failure or if a sensor is migrated to a new location and becomes closer to a different collector. In some example embodiments, sensors 104 can send different types of network traffic data to different collectors. For example, sensors 104 can send network traffic data related to one type of process to one collector and network traffic data related to another type of process to another collector.

Collectors 108 can serve as a repository for the data recorded by sensors 104. In some example embodiments, collectors 108 can be directly connected to a top of rack switch. In other example embodiments, collectors 108 can be located near an end of row switch. Collectors 108 can be located on or off premises. It will be appreciated that the placement of collectors 108 can be optimized according to various priorities such as network capacity, cost, and system responsiveness. In some example embodiments, data storage of collectors 108 is located in an in-memory database, such as dashDB by IBM. This approach benefits from rapid random access speeds that typically are required for analytics software. Alternatively, collectors 108 can utilize solid state drives, disk drives, magnetic tape drives, or a combination of the foregoing according to cost, responsiveness, and size requirements. Collectors 108 can utilize various database structures such as a normalized relational database or NoSQL database.

In some example embodiments, collectors 108 may only serve as network storage for network traffic monitoring system 100. In other example embodiments, collectors 108 can organize, summarize, and preprocess data. For example, collectors 108 can tabulate how often packets of certain sizes or types are transmitted from different nodes of a data center. Collectors 108 can also characterize the traffic flows going to and from various nodes. In some example embodiments, collectors 108 can match packets based on sequence numbers, thus identifying traffic flows and connection links. In some example embodiments, collectors 108 can flag anomalous data. Because it would be inefficient to retain all data indefinitely, in some example embodiments, collectors 108 can periodically replace detailed network traffic flow data with consolidated summaries. In this manner, collectors 108 can retain a complete dataset describing one period (e.g., the past minute or other suitable period of time), with a smaller dataset of another period (e.g., the previous 2-10 minutes or other suitable period of time), and progressively consolidate network traffic flow data of other periods of time (e.g., day, week, month, year, etc.). By organizing, summarizing, and preprocessing the network traffic flow data, collectors 108 can help network traffic monitoring system 100 scale efficiently. Although collectors 108 are generally referred to herein in the plurality, it will be appreciated that collectors 108 can be implemented using a single machine, especially for smaller datacenters.

In some example embodiments, collectors 108 can receive data from external data sources 106, such as security reports, white-lists (106*a*), IP watchlists (106*b*), whois data (106*c*), or out-of-band data, such as power status, temperature readings, etc.

In some example embodiments, network traffic monitoring system 100 can include a wide bandwidth connection between collectors 108 and analytics module 110. Analytics module 110 can include application dependency (ADM) module 160, reputation module 162, vulnerability module 164, malware detection module 166, etc., to accomplish various tasks with respect to the flow data collected by sensors 104 and stored in collectors 108. In some example embodiments, network traffic monitoring system 100 can automatically determine network topology. Using network traffic flow data captured by sensors 104, network traffic monitoring system 100 can determine the type of devices existing in the network (e.g., brand and model of switches, gateways, machines, etc.), physical locations (e.g., latitude and longitude, building, datacenter, room, row, rack, machine, etc.), interconnection type (e.g., 10 Gb Ethernet, fiber-optic, etc.), and network characteristics (e.g., bandwidth, latency, etc.). Automatically determining the network topology can assist with integration of network traffic monitoring system 100 within an already established datacenter. Furthermore, analytics module 110 can detect changes of network topology without the need of further configuration.

Analytics module 110 can determine dependencies of components within the network using ADM module 160. For example, if component A routinely sends data to component B but component B never sends data to component A, then analytics module 110 can determine that component B is dependent on component A, but A is likely not dependent on component B. If, however, component B also sends data to component A, then they are likely interdependent. These components can be processes, virtual machines, hypervisors, VLANs, etc. Once analytics module 110 has determined component dependencies, it can then form a component ("application") dependency map. This map can be instructive when analytics module 110 attempts to determine a root cause of a failure (because failure of one component can cascade and cause failure of its dependent components). This map can also assist analytics module 110 when attempting to predict what will happen if a component is taken offline. Additionally, analytics module 110 can associate edges of an application dependency map with expected latency, bandwidth, etc. for that individual edge.

Analytics module 110 can establish patterns and norms for component behavior. For example, it can determine that certain processes (when functioning normally) will only send a certain amount of traffic to a certain VM using a small set of ports. Analytics module can establish these norms by analyzing individual components or by analyzing data coming from similar components (e.g., VMs with similar configurations). Similarly, analytics module 110 can determine expectations for network operations. For example, it can determine the expected latency between two components, the expected throughput of a component, response times of a component, typical packet sizes, traffic flow signatures, etc. In some example embodiments, analytics module 110 can combine its dependency map with pattern analysis to create reaction expectations. For example, if traffic increases with one component, other components may predictably increase traffic in response (or latency, compute time, etc.).

In some example embodiments, analytics module 110 can use machine learning techniques to identify security threats to a network using malware detection module 166. For example, malware detection module 166 can be provided with examples of network states corresponding to an attack and network states corresponding to normal operation. Malware detection module 166 can then analyze network traffic flow data to recognize when the network is under attack. In some example embodiments, the network can operate within a trusted environment for a time so that analytics module 110 can establish baseline normalcy. In some example embodiments, analytics module 110 can contain a database of norms and expectations for various components. This database can incorporate data from sources external to the network (e.g., external sources 106). Analytics module 110 can then create access policies for how components can interact using policy engine 112. In some example embodiments, policies can be established external to network traffic monitoring system 100 and policy engine 112 can detect the policies and incorporate them into analytics module 110. A network administrator can manually tweak the policies. Policies can dynamically change and be conditional on events. These policies can be enforced by the components depending on a network control scheme implemented by a network. Policy engine 112 can maintain these policies and receive user input to change the policies.

Policy engine 112 can configure analytics module 110 to establish or maintain network policies. For example, policy engine 112 may specify that certain machines should not intercommunicate or that certain ports are restricted. A network and security policy controller (not shown) can set the parameters of policy engine 112. In some example embodiments, policy engine 112 can be accessible via presentation module 116. In some example embodiments, policy engine 112 can include policy data 112. In some example embodiments, policy data 112 can include EPG data 114, which can include the mapping of EPGs to IP addresses and/or MAC addresses. In some example embodiments, policy data 112 can include policies for handling data packets.

In some example embodiments, analytics module 110 can simulate changes in the network. For example, analytics module 110 can simulate what may result if a machine is taken offline, if a connection is severed, or if a new policy is implemented. This type of simulation can provide a network administrator with greater information on what policies to implement. In some example embodiments, the simulation may serve as a feedback loop for policies. For example, there can be a policy that if certain policies would affect certain services (as predicted by the simulation) those policies should not be implemented. Analytics module 110 can use simulations to discover vulnerabilities in the datacenter. In some example embodiments, analytics module 110 can determine which services and components will be affected by a change in policy. Analytics module 110 can then take necessary actions to prepare those services and components for the change. For example, it can send a notification to administrators of those services and components, it can initiate a migration of the components, it can shut the components down, etc.

In some example embodiments, analytics module 110 can supplement its analysis by initiating synthetic traffic flows and synthetic attacks on the datacenter. These artificial actions can assist analytics module 110 in gathering data to enhance its model. In some example embodiments, these synthetic flows and synthetic attacks are used to verify the integrity of sensors 104, collectors 108, and analytics module 110. Over time, components may occasionally exhibit anomalous behavior. Analytics module 110 can analyze the frequency and severity of the anomalous behavior to determine a reputation score for the component using reputation module 162. Analytics module 110 can use the reputation score of a component to selectively enforce policies. For example, if a component has a high reputation score, the component may be assigned a more permissive policy or more permissive policies; while if the component frequently violates (or attempts to violate) its relevant policy or policies, its reputation score may be lowered and the component may be subject to a stricter policy or stricter policies. Reputation module 162 can correlate observed reputation score with characteristics of a component. For example, a particular virtual machine with a particular configuration may be more prone to misconfiguration and receive a lower reputation score. When a new component is placed in the network, analytics module 110 can assign a starting reputation score similar to the scores of similarly configured components. The expected reputation score for a given component configuration can be sourced outside of the datacenter. A network administrator can be presented with expected reputation scores for various components before installation, thus assisting the network administrator in choosing components and configurations that will result in high reputation scores.

Some anomalous behavior can be indicative of a misconfigured component or a malicious attack. Certain attacks may be easy to detect if they originate outside of the datacenter, but can prove difficult to detect and isolate if they originate from within the datacenter. One such attack could be a distributed denial of service (DDOS) where a component or group of components attempt to overwhelm another component with spurious transmissions and requests. Detecting an attack or other anomalous network traffic can be accomplished by comparing the expected network conditions with actual network conditions. For example, if a traffic flow varies from its historical signature (packet size, TCP header options, etc.) it may be an attack.

In some cases, a traffic flow may be expected to be reported by a sensor, but the sensor may fail to report it. This situation could be an indication that the sensor has failed or become compromised. By comparing the network traffic flow data from multiple sensors 104 spread throughout the datacenter, analytics module 110 can determine if a certain sensor is failing to report a particular traffic flow.

Presentation module 116 can include serving layer 118, authentication module 120, web front end 122, public alert module 124, and third party tools 126. In some example embodiments, presentation module 116 can provide an external interface for network monitoring system 100. Using presentation module 116, a network administrator, external software, etc. can receive data pertaining to network monitoring system 100 via a webpage, application programming interface (API), audiovisual queues, etc. In some example embodiments, presentation module 116 can preprocess and/or summarize data for external presentation. In some example embodiments, presentation module 116 can generate a webpage. As analytics module 110 processes network traffic flow data and generates analytic data, the analytic data may not be in a human-readable form or it may be too large for an administrator to navigate. Presentation module 116 can take the analytic data generated by analytics module 110 and further summarize, filter, and organize the analytic data as well as create intuitive presentations of the analytic data.

Serving layer 118 can be the interface between presentation module 116 and analytics module 110. As analytics module 110 generates reports, predictions, and conclusions, serving layer 118 can summarize, filter, and organize the information that comes from analytics module 110. In some example embodiments, serving layer 118 can also request raw data from a sensor or collector.

Web frontend 122 can connect with serving layer 118 to present the data from serving layer 118 in a webpage. For example, web frontend 122 can present the data in bar charts, core charts, tree maps, acyclic dependency maps, line graphs, tables, etc. Web frontend 122 can be configured to allow a user to "drill down" on information sets to get a filtered data representation specific to the item the user wishes to drill down to. For example, individual traffic flows, components, etc. Web frontend 122 can also be configured to allow a user to filter by search. This search filter can use natural language processing to analyze the user's input. There can be options to view data relative to the current second, minute, hour, day, etc. Web frontend 122 can allow a network administrator to view traffic flows, application dependency maps, network topology, etc.

In some example embodiments, web frontend 122 may be solely configured to present information. In other example embodiments, web frontend 122 can receive inputs from a network administrator to configure network traffic monitoring system 100 or components of the datacenter. These instructions can be passed through serving layer 118 to be sent to configuration and image manager 102 or policy engine 112. Authentication module 120 can verify the identity and privileges of users. In some example embodiments, authentication module 120 can grant network administrators different rights from other users according to established policies.

Public alert module 124 can identify network conditions that satisfy specified criteria and push alerts to third party tools 126. Public alert module 124 can use analytic data generated or accessible through analytics module 110. One example of third party tools 126 is a security information and event management system (SIEM). Third party tools 126 may retrieve information from serving layer 118 through an API and present the information according to the SIEM's user interfaces.

Figure 2:
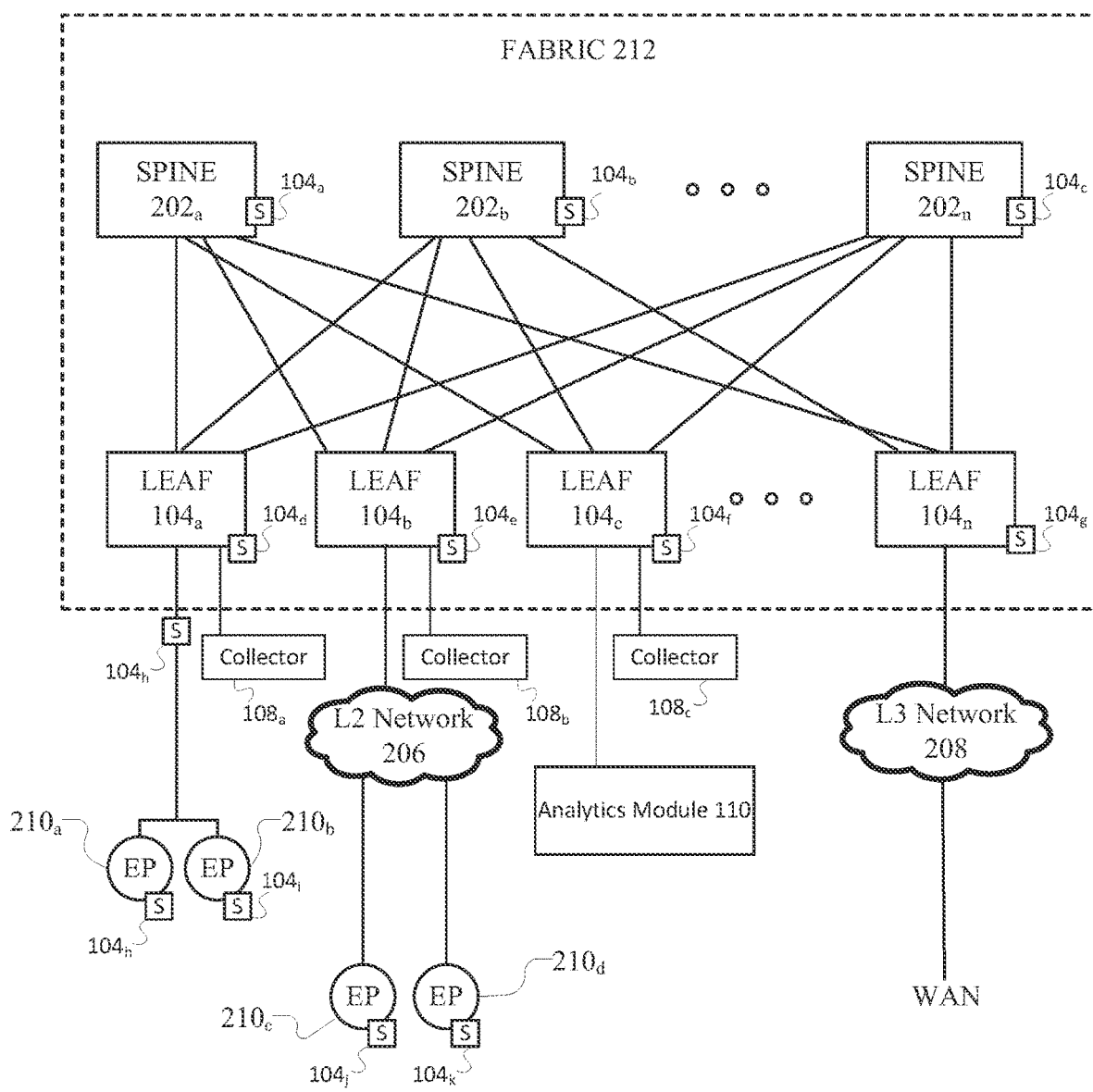
FIG. 2 shows an example network according to some embodiments.

FIG. 2 illustrates an example network environment 200 according to some example embodiments. It should be understood that, for the network environment 100 and any environment discussed herein, there can be additional or fewer nodes, devices, links, networks, or components in similar or alternative configurations. Example embodiments with different numbers and/or types of clients, networks, nodes, cloud components, servers, software components, devices, virtual or physical resources, configurations, topologies, services, appliances, deployments, or network devices are also contemplated herein. Further, network environment 200 can include any number or type of resources, which can be accessed and utilized by clients or tenants. The illustrations and examples provided herein are for clarity and simplicity.

Network environment 200 can include network fabric 212, layer 2 (L2) network 206, layer 3 (L3) network 208, endpoints 210a, 210b, . . . , and 210d (collectively, "204"). Network fabric 212 can include spine switches 202a, 202b, . . . , 202n (collectively, "202") connected to leaf switches 204a, 204b, 204c, . . . , 204n (collectively, "204"). Spine switches 202 can connect to leaf switches 204 in network fabric 212. Leaf switches 204 can include access ports (or non-fabric ports) and fabric ports. Fabric ports can provide uplinks to spine switches 202, while access ports can provide connectivity for devices, hosts, endpoints, VMs, or other electronic devices (e.g., endpoints 204), internal networks (e.g., L2 network 206), or external networks (e.g., L3 network 208).

Leaf switches 204 can reside at the edge of network fabric 212, and can thus represent the physical network edge. In some cases, leaf switches 204 can be top-of-rack switches configured according to a top-of-rack architecture. In other cases, leaf switches 204 can be aggregation switches in any particular topology, such as end-of-row or middle-of-row topologies. Leaf switches 204 can also represent aggregation switches, for example.

Network connectivity in network fabric 212 can flow through leaf switches 204. Here, leaf switches 204 can provide servers, resources, VMs, or other electronic devices (e.g., endpoints 210), internal networks (e.g., L2 network 206), or external networks (e.g., L3 network 208), access to network fabric 212, and can connect leaf switches 204 to each other. In some example embodiments, leaf switches 204 can connect endpoint groups (EPGs) to network fabric 212, internal networks (e.g., L2 network 206), and/or any external networks (e.g., L3 network 208). EPGs can be used in network environment 200 for mapping applications to the network. In particular, EPGs can use a grouping of application endpoints in the network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries. For example, each EPG can connect to network fabric 212 via leaf switches 204.

Endpoints 210 can connect to network fabric 212 via leaf switches 204. For example, endpoints 210a and 210b can connect directly to leaf switch 204a, which can connect endpoints 210a and 210b to network fabric 212 and/or any other one of leaf switches 204. Endpoints 210c and 210d can connect to leaf switch 204b via L2 network 206. Endpoints 210c and 210d and L2 network 206 are examples of LANs. LANs can connect nodes over dedicated private communications links located in the same general physical location, such as a building or campus.

Wide area network (WAN) 212 can connect to leaf switches 204c or 204d via L3 network 208. WANs can connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. Endpoints 210 can include any communication device or component, such as a computer, server, hypervisor, virtual machine, container, process (e.g., running on a virtual machine), switch, router, gateway, host, device, external network, etc. In some example embodiments, endpoints 210 can include a server, hypervisor, process, or switch configured with virtual tunnel endpoint (VTEP) functionality which connects an overlay network with network fabric 212. The overlay network may allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), can provide a traffic encapsulation scheme which allows network traffic to be carried across L2 and L3 networks over a logical tunnel. Such logical tunnels can be originated and terminated through VTEPs. The overlay network can host physical devices, such as servers, applications, endpoint groups, virtual segments, virtual workloads, etc. In addition, endpoints 210 can host virtual workload(s), clusters, and applications or services, which can connect with network fabric 212 or any other device or network, including an internal or external network. For example, endpoints 210 can host, or connect to, a cluster of load balancers or an EPG of various applications.

Network environment 200 can also integrate a network traffic monitoring system, such as the one shown in FIG. 1. For example, as shown in FIG. 2, the network traffic monitoring system can include sensors 104a, 104b, . . . , 104n (collectively, "104"), collectors 108a, 108b, . . . 108n (collectively, "108"), and analytics module 110. In some example embodiments, spine switches 202 do not have sensors 104. Analytics module 110 can receive and process network traffic data collected by collectors 108 and detected by sensors 104 placed on nodes located throughout network environment 200. In some example embodiments, analytics module 110 can be implemented in an active-standby model to ensure high availability, with a first analytics module functioning in a primary role and a second analytics module functioning in a secondary role. If the first analytics module fails, the second analytics module can take over control. Although analytics module 110 is shown to be a standalone network appliance in FIG. 2, it will be appreciated that analytics module 110 can also be implemented as a VM image that can be distributed onto a VM, a cluster of VMs, a software as a service (SaaS), or other suitable distribution model in various other example embodiments. In some example embodiments, sensors 104 can run on endpoints 210, leaf switches 204, spine switches 202, in-between network elements (e.g., sensor 104h), etc. In some example embodiments, leaf switches 204 can each have an associated collector 108. For example, if leaf switch 204 is a top of rack switch then each rack can contain an assigned collector 108.

Although network fabric 212 is illustrated and described herein as an example leaf-spine architecture, one of ordinary skill in the art will readily recognize that the subject technology can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. It should be understood that sensors and collectors can be placed throughout the network as appropriate according to various architectures.

Systems and methods according to some example embodiments provide for network policies that can dynamically change based on security measurements for network endpoints. In some example embodiments, a reputation module (e.g., reputation module 162) can determine the security measurements for network endpoints. FIG. 3 illustrates an example policy table 300 according to some example embodiments. Policy table 300 can include policies 301a-301f (collectively, "301") for enforcement in a network. Each policy 301 can specify packet attributes 302 such as source 304, destination 308, action 316 to be applied to a packet when the packet matches each of packet attributes 302, and policy use count 318. A packet attribute can be a description of a certain characteristic that can be matched with a communication (e.g., a subnet or port range). Source 304 and destination 308 packet attributes can include a MAC address (e.g., source for policy 301c), IP address (e.g., source for policy 301a), endpoint 210, endpoint group (e.g., source for policy 301b), user (e.g., destination for policy 301d), process (e.g., name, PID as in destination for policy 301e), subnet, geographical location (e.g., destination for policy 301a), etc.—including any combination of the foregoing. In some example embodiments, the source and destination are of different types (e.g., source is a MAC address while destination is an endpoint group) while in some example embodiments one or both of source and destination are not specified.

Policy table 300 may be information provided to a network administrator or other user to more easily associate certain endpoints with their applicable policies. In other embodiments, there may be a policy table listing only source EPGs and destination EPGs, and a separate data structure or separate data structures for associating EPGs to MAC addresses (e.g., source for policy 301c), IP addresses (e.g., source for policy 301a), users (e.g., destination for policy 301d), processes (e.g., name, PID as in destination for policy 301e), subnets, geographical locations (e.g., destination for policy 301a), etc. By way of example, policy 301a could match a communication sent by an EPG, defined as the endpoint having a particular IP address (e.g., source for policy 301a), to an EPG defined as endpoints located in the geographic location of France (e.g., destination for policy 301a). The resultant action could be to allow the communication. As another example, policy 301b could match a communication initiated by any endpoint 210 associated with endpoint group 2 to endpoint labelled 3, 4, or 5. The resultant action 316 could be to block the communication.

In some example embodiments, there is a single policy table 300 that is identical across an entire network; alternatively, policy table 300 can be distributed such that parts of it are stored and applied differently on different parts of the network. For example, policies 301 pertaining to one LAN can be stored on a switch associated with that LAN but not stored on other switches that are not on that LAN.

Policy table 300 can be a list, tree, map, matrix, etc. of policies 301. In some example embodiments, the relative position of policies 301 is relevant to their enforcement. For example, enforcement can include going through policy table until a policy 301 matches the communication detected. If policy 300 is a tree structure, enforcement can include traversing the tree by matching policy packet attributes until a match is determined.

A network defined by policies that allow a communication between source and destination or otherwise default to denial of the communication can be called a whitelist policy system while a network defined by policies that block a communication between source and destination or otherwise default to allowing the communication can be called a blacklist system. In some example embodiments, policy table may only include whitelist policies and all other communications can be blocked; in some example embodiments, policy table 300 can only contain blacklist policies and all other communications can be allowed. In some situations, policies may conflict; for example, a general policy may allow a certain communication while a more specific policy may block the communication. In some such example embodiments, various resolution techniques can be implemented; for example, the policies can be ordered according to importance and the first matching policy can be enforced with respect to the communication. In some example embodiments, the most specific policy can be implemented; specific meaning that the match is according to a high degree of granularity. For example, a policy (or EPG) that pertains to an IP address of 192.168.1.5 is more specific than a policy or EPG that pertains to an IP subnet of 192.168.1.0/24 because the former describes a single IP address instead of the latter, which is applicable to 254 IP addresses. Specificity can be determined by any of the packet attributes described in a policy, such as IP address, port, etc.

In some example embodiments, a policy can include a counter of how many communications are described by the policy during a certain time. After a certain number of communications within a certain time are detected, the policy can activate, invoking action 316.

Action 316 can be the action that is applied to a communication when the communication matches a corresponding policy. For example, action 316 can be to permit or allow the flow described in policy 301 (i.e., forward the communication), block or deny the flow described in the policy (i.e., drop the communication), limit the bandwidth consumed by the flow, log the flow, "mark" the flow for quality of service (QoS) (e.g., set a lower or higher priority for the flow), redirect the flow (e.g., to avoid critical paths), copy the flow, etc. In some example embodiments, action 316 can have an expiration time or date. For example, it can only take the designated action (e.g., allow, block, mark, etc.) for a certain amount of time before the communication is dropped. Similarly, action 316 can have designated times of applicability, for example only during peak hours. A policy can be over-inclusive or under-inclusive. For example, in certain situations, a whitelist policy may allow communications that are potentially harmful to the network while a blacklist policy 301 can block communications that are permitted by the network.

In some example embodiments, a policy 301 can include policy use count 318 which can represent how many communications are described by policy 301 during a certain time. Policy use count 318 can represent that policy 301 has been utilized (a binary value), the number of times policy 301 has been utilized, the proportion of communications that utilized policy 301 (e.g., 33 of $204_8$ communications), the elapsed time since policy 301 was last invoked, a timestamp of the last time policy 301 was utilized, etc.

Policy use count 318 can reflect the number of flows, packets, connections, communications, distinct flow traffic, and/or the quantity of the traffic (e.g., gigabytes). In some example embodiments, policy 301 can include a historical record of policy use count 318. For example, the historical record can contain values of policy use count for past minutes, hours, days, weeks, months, years, etc.

Figure 4:
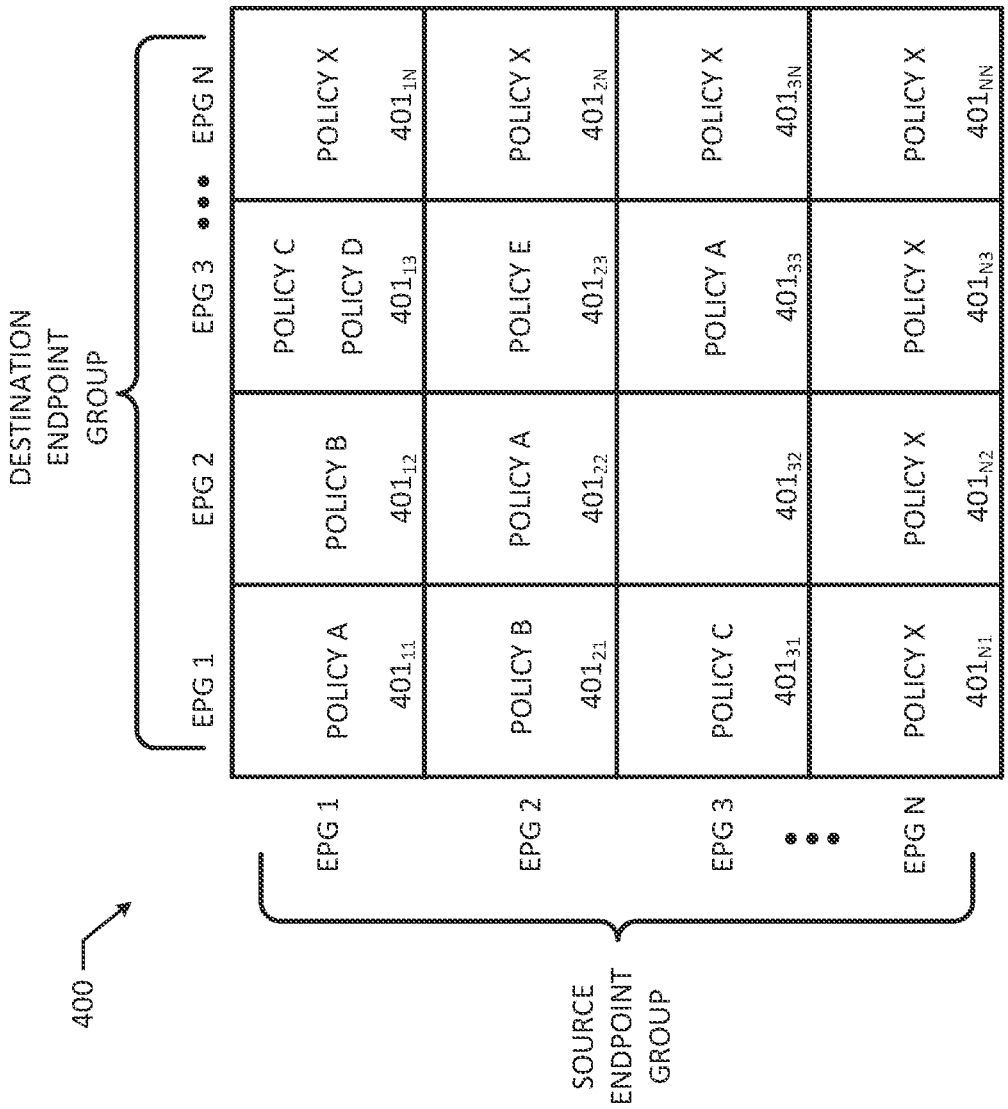
FIG. 4 shows an example policy matrix according to some embodiments.

In some example embodiments, policy use count 318 table can be organized as a policy matrix of n-dimensions, each dimension corresponding to a packet attribute. FIG. 4 illustrates an example policy matrix 400 according to some example embodiments. Policy matrix 400 can include one dimension for the source (e.g., Source Endpoint Group) and a second dimension for the destination (e.g., Destination Endpoint Group). When using such a policy matrix, a certain destination EPG (e.g., EPG 3) and a certain source EPG (e.g., EGP2) can invoke policy result 401 (e.g., result $401_{23}$). Policy result 401 can include no policy (e.g., result $401_{32}$), one policy (e.g., result $401_{12}$), or more than one policy (e.g., result $401_{13}$).

Figure 5:
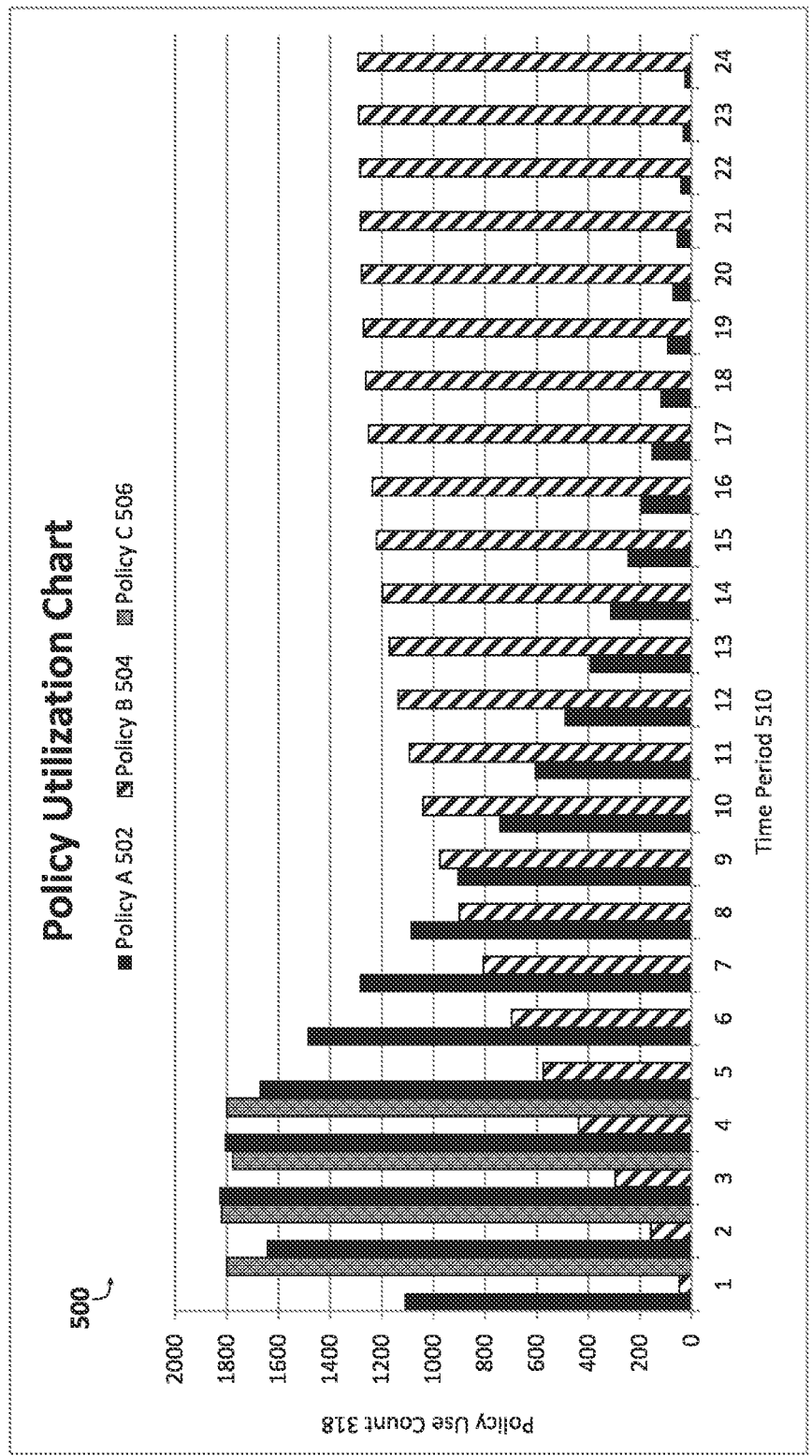
FIG. 5 shows an example policy use chart according to some embodiments.

FIG. 5 shows an example policy utilization chart 500. In some example embodiments, policy utilization chart 500 can show how a policy use count changes over time period 510. For example, in example policy utilization chart 500 policy C 506 was used extensively during time period 510 1-4 and then drops off suddenly. This drop-off can represent that an endpoint was taken offline, that a policy was changed (to not apply to certain communications), or that a more specific policy was created that gets applied before policy C 506 could be activated. Policy A 502 shows a gradual decline in usage while policy B 502 shows a gradual ramp up to a stable and consistent value. A representation such as policy utilization chart 500 can be useful for a network administrator for rapid diagnostics of network conditions. It should be understood that other charts and diagrams are possible to represent policies.

Policy utilization chart 500 can be a depiction of the data contained in the historical record of policy use count. A system can identify that a policy is no longer utilized (e.g., policy C 506), that a policy is heavily utilized (e.g., policy B 504), or that a policy is utilized infrequently (e.g., policy A 502). In some example embodiments, a network administrator and/or network management system can delete or remove unused policies (e.g., policy C 506). In some example embodiments, a system can deprioritize unused or infrequently utilized policies (e.g., policy B 504 or policy C 506). "Deprioritizing" a policy can include putting the policy at a lower priority position of a policy table (e.g., policy table 300 of FIG. 3) so that other policies are checked before the deprioritized policy. As will be appreciated by one of ordinary skill in the art, the policy table can be implemented in software as a component of a network controller or network policy management system or in hardware (e.g., encoded in ternary content-addressable memory (TCAM) of a network device). In some example embodiments, deprioritizing a policy includes checking the policy against a sample of flows and not every flow. In some such embodiments, once a policy is implemented in the network for a suitable period of time, the network controller and/or network policy management system can reprioritize the policy relative to other existing policies.

Figure 6:
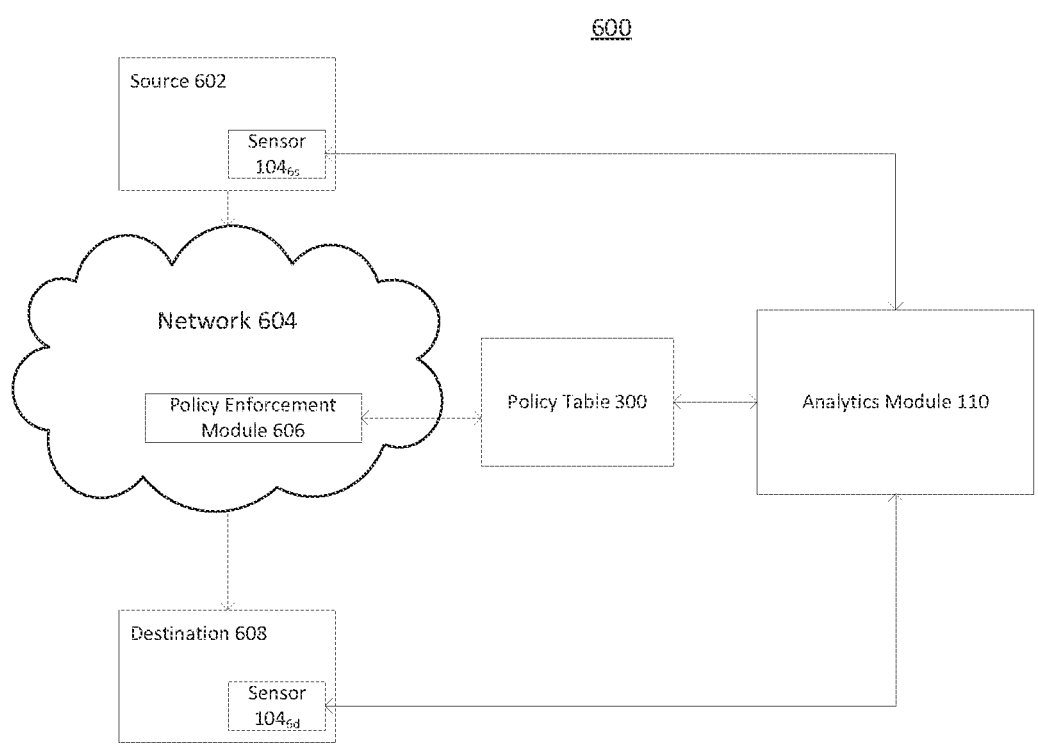
FIG. 6 shows an example network structure according to some embodiments.

FIG. 6 depicts an example network environment 600 according to some embodiments. Source node 602 can communicate (i.e., initiate a flow) with destination node 608 by sending data (e.g., packets) through network 604. Source node 602 and destination node 608 can be endpoints. Alternatively, source node 602 and/or destination node 608 can represent an intermediary for a flow (e.g., a switch or router). Sensor $104_{6s}$ can monitor traffic from source node 602 and sensor $104_{6d}$ can monitor traffic from destination node 608. Within network 602, policy enforcement module 606 can enforce policies (e.g., policies 301 of FIG. 3). Analytics module 110 can set and read the policies from the policy table 300 while also gathering and analyzing packet information recovered from sensor $104_{6s}$ and $104_{6d}$.

In some example embodiments, sensor $104_{6s}$ sends network flow data (e.g., source record) to analytics module 110 describing a packet, communication, flow, etc. that is being sent to network 604 by source node 602. This description of the packet can include various packet attributes 302 such as a destination address, a source address, a sequence number, a port, a protocol, timestamp, etc. Similarly, sensor $104_{6d}$ can send network flow data (e.g., destination record) to analytics module 110 describing a packet, communication, flow, etc. that has been received over network 604 by destination node 608.

Analytics module 110 can then review the network flow data that it receives from sensor $104_{6s}$ and sensor $104_{6d}$ to determine if they describe the same packet, flow, or communication. In some example embodiments, matching a source log from sensor $104_{6s}$ and a destination log from sensor $104_{6d}$ can be challenging, especially if the logs lack complete information. For example, the destination log may only indicate that destination node 608 received a packet from source node 602 at a certain time. Further, various tunneling, encapsulation, and virtualization techniques may obfuscate certain parameters. Analytics module 110 can predict whether the two logs likely describe the same communication by looking at the time difference between the two logs as well as the descriptions of source node 602 and destination node 608.

In some example embodiments, sensor $104_{6s}$ detects that source node 602 received an "ACK" packet from destination node 608 in response to a packet previously sent to destination node 608. Sensor $104_{6s}$ can then send network flow data to analytics module 110 that the communication from source node 602 to destination node 608 was successful. If sensor $104_{6s}$ detects that "ACK" was not received, it can send network flow data to analytics module 110 indicating that the communication was unsuccessful.

In some example embodiments, multiple sensors 104 report on a single packet as it traverses the network. For example, sensors 104 installed on a virtual machines, hypervisors, switches, network devices, firewalls, etc. may all detect the packet as it passes through the network. Analytics module 110 can then receive network flow data from each sensor 104 and, if a packet was blocked, determine where the blocking occurred.

After determining whether a packet, communication, or flow was blocked or allowed, analytics module 110 can determine if the policy within policy table 300 was applied to allow or block the packet. For example, if the packet described in the source log was never received by destination node 608 (e.g. there may not exist a destination log that describes the packet), the packet was likely blocked and analytics module 110 can look into policy table 300 to determine if a policy 301 matches the attempted transmission. If there is a corresponding destination log that describes the packet from the source log, then the packet was allowed and analytics module can determine if a policy within policy table 300 matches the transmission. When a policy is matched, analytics module 110 can increment a counter (e.g., policy use count 318) in policy table 300 to reflect its use. Analytics module 110 can add an entry in a log either in policy table 300 or elsewhere describing the policy's use.

In some example embodiments, a policy within policy table 300 is inconsistent with the network flow data sent by sensors 104. For example, a policy 301 may say that a flow should be blocked but the sensors 104 may report that the flow was allowed. Analytics module can then indicate that the policy's application was frustrated. This can alert network administrators of potential holes in their network security system. For example, a policy may dictate that communications between two virtual machines should be blocked but the sensors 104 may report that the communication was allowed. This may be the result of a faulty network configuration, for example if policy enforcement module 606 is not placed in the path from source node 602 to destination node 608 (e.g., if source node 602 and destination node 608 are virtual machines on the same bare metal machine).

In some example embodiments, policy enforcement module 606 reports in policy table 300 by incrementing a counter (e.g., policy use count 318) or adding an entry to a log to indicate that policy 301 was applied. In some example embodiments, sensors 104 can include monitor policy enforcement; in some such embodiments sensor 104 can report to policy table 300 or analytics module 110 if a policy is applied.

In some example embodiments, policy table 300 describes source node 602 using one descriptor while the source log from $104_{6s}$ describes a packet source using another descriptor. For example, the descriptor from the policy may describe an IP address range or endpoint group while the descriptor from the log describes a single IP address, a MAC address, or an endpoint. In some such embodiments, analytics module 110 can determine an endpoint group, address range, etc. for the packet. Similarly, the destination log may describe the destination using one descriptor (e.g., endpoint) and analytics module 110 can determine a policy descriptor (e.g., endpoint group) that can be associated with the packet.

Figure 7:
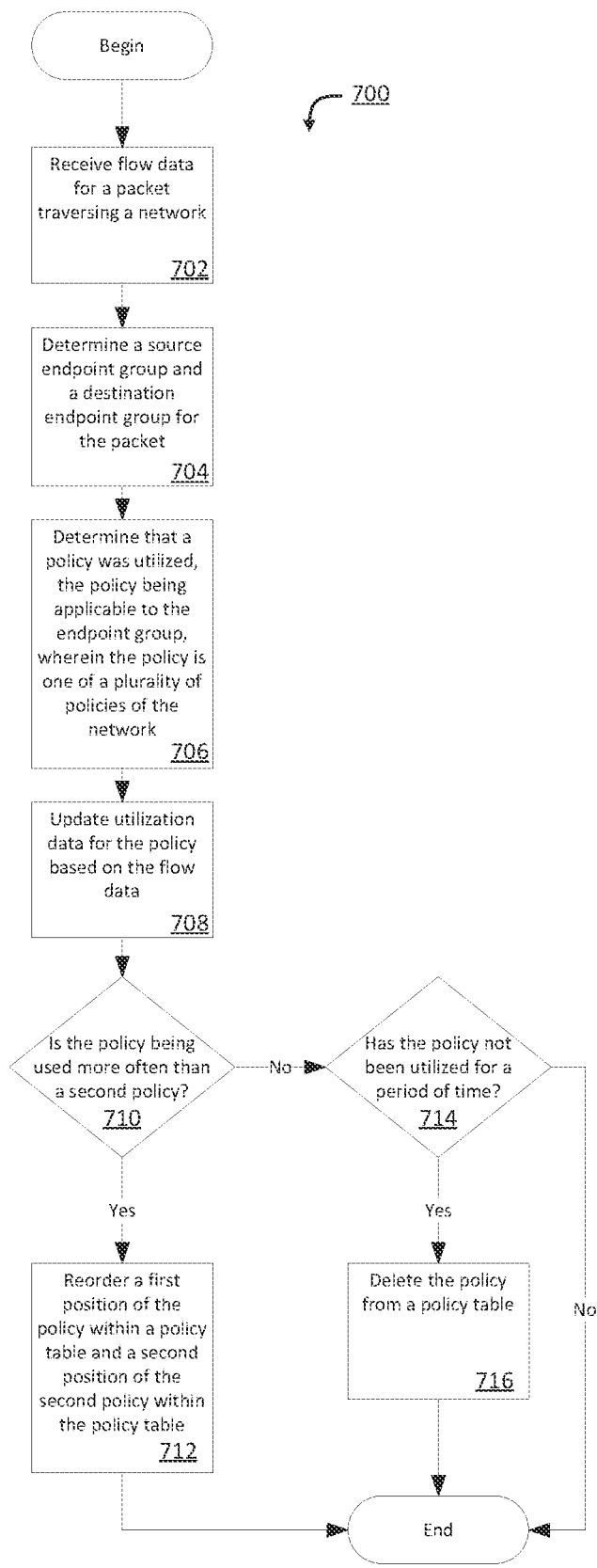
FIG. 7 shows an example process according to some embodiments.

FIG. 7 depicts an example process 700 according to some embodiments. A network traffic monitoring system (e.g., network traffic monitoring system 100 of FIG. 1) performing the steps in process 700 can begin by receiving flow data for a packet traversing a network (step 702). This flow data can uniquely describe the packet or can describe a collection of packets, communications, or flows. Flow data can also be part of network flow data. Flow data can be received from a sensor 104 or other network device.

The system can then determine a source endpoint group and a destination endpoint group for the packet (step 704). A table can be utilized for step 704. In some example embodiments, the packet is associated with a source and the source is associated with the endpoint group.

The system can then determine whether the policy was enforced (step 706). In some example embodiments, this can be accomplished by finding a policy in policy table 300 applicable to packet. The policy may be applicable if a number of packet attributes of the packet describe the flow (e.g., source address, destination address, port, etc.). In some situations, the policy may allow traffic and enforcement of the policy can be determined based on the destination receiving the packet. In other situations, the policy may be to deny traffic between the source and the destination. Determining whether the policy was successfully enforced may be based on the destination not receiving the packet. Conversely, a policy to allow traffic is not enforced when there is no indication that the packet was received by the destination and a policy to deny traffic is not enforced when it is determined that the packet was received by the destination.

The system can then update utilization data for the policy based on the flow data (step 708). This can include updating statistics for the policy. In some example embodiments, step 708 includes an entry of when the policy 301 was utilized.

The system can then determine whether the policy is being used more often than a second policy (step 710). If yes, the system can reorder a first position of the policy within a policy table and a second position of the second policy within the policy table (712). Some policy tables can include a large number of policies. The position of a policy may influence how long it takes for a system to check the policy. Policies that are utilized more often could be placed in a position where they will be checked faster. This can be useful in systems that apply the first policy that matches the flow.

If step 710 yields a "no", the system can determine if the policy has not been utilized for a period of time (step 714). Over time, policies may accumulate in a data center, even long after they are relevant. For example, an administrator may remove a machine or uninstall a program but is hesitant to remove the relevant policy out of fear that other systems depend on it. Some policies that are no longer used are likely no longer relevant and can be removed by deleting the policy from the policy table (step 716). This can be especially useful with whitelist policies that could be exploited by malicious applications.

Process 700 can end after step 712, step 716, or step 714 (if the determination is "no").

Figure 8A:
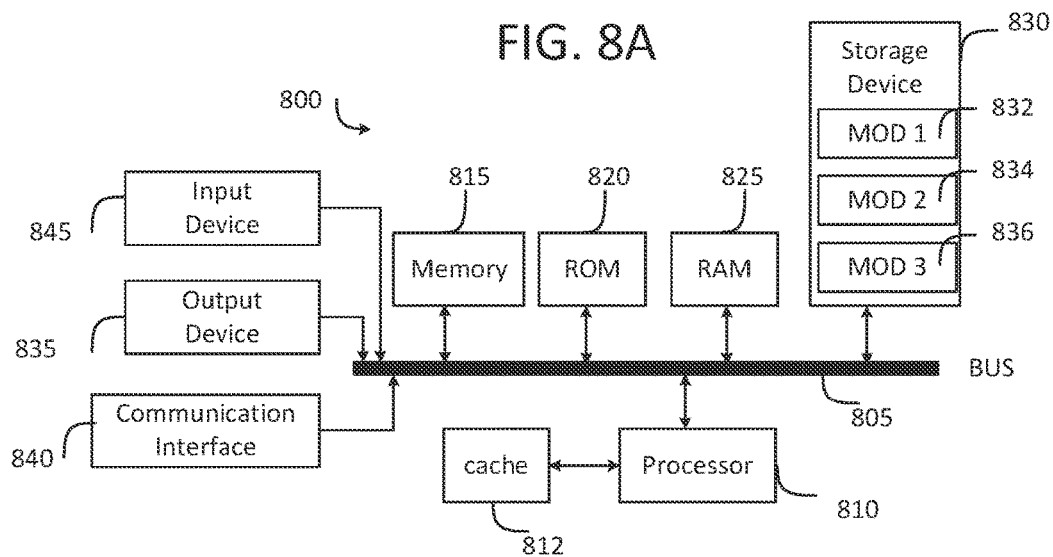
FIGS. 8A and 8B show example system embodiments.
Figure 8B:
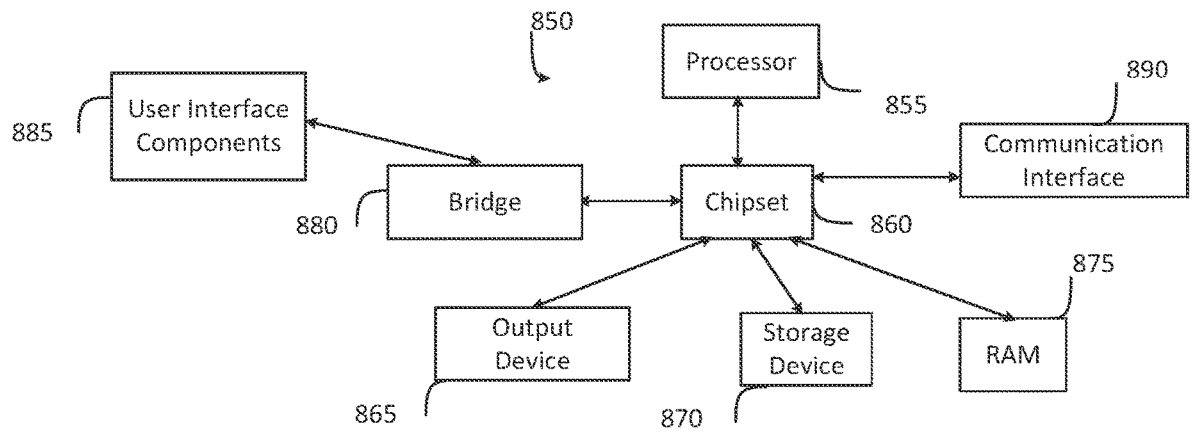

FIG. 8A and FIG. 8B illustrate example system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Example system 800 includes a processing unit (CPU or processor) 810 and a system bus 805 that couples various system components including the system memory 815, such as read only memory (ROM) 870 and random access memory (RAM) 875, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 837, module 8 834, and module 3 836 stored in storage device 830, configured to control the processor 910 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 875, read only memory (ROM) 870, and hybrids thereof.

The storage device 830 can include software modules 837, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates an example computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A computer-implemented method comprising:
receiving, at a traffic monitoring system, flow data that uniquely describes one of more packets traversing a network, wherein the flow data different than the one or more packets and the flow data is received outside a path the one or more packets are traversing;
determining, from the flow data, one or more endpoint groups associated with the one or more packets;
determining, by the traffic monitoring system, whether a first policy was enforced on the one or more packets based at least on part on whether a packet of the one or more packets was blocked or allowed at an endpoint of the one or more endpoint groups, wherein the first policy is associated with the one or more endpoint groups;
in response to the first policy being enforced, updating, by the traffic monitoring system, utilization data for the first policy in a policy table;
determining, based on a comparison of utilization data in the policy table, whether the first policy is utilized more than a second policy; and
in response to determining that the first policy is utilized more than the second policy, reordering, by the traffic monitoring system, a first position of the first policy and a second position of the second policy in the policy table.

2. The method of claim 1, further comprising:
in response to determining that the first policy is not utilized more than the second policy, determining if the first policy has not been utilized for a period of time; and
in response to determining that the first policy has not been utilized for the period of time, deleting the first policy from the policy table.

3. The method of claim 2, wherein the first policy is a whitelist policy.

4. The method of claim 1, further comprising:
determining whether the first policy was enforced for the flow data.

5. The method of claim 4, wherein determining whether the first policy was enforced based on the flow data received at a destination and/or sent by a source.

6. The method of claim 1, wherein the flow data comprises data that is received from a network device, a hypervisor, a container, or a virtual machine.

7. The method of claim 1, further comprising:
presenting the utilization data of the first policy including at least one of a number of flows, a number of packets, or a quantity of data received by a network in relation to a period of time.

8. The method of claim 1, further comprising:
receiving additional flow data; and
determining whether the first policy is applicable to the additional flow data.

9. The method of claim 8, wherein the first policy is configured to deny connectivity from a source and/or a destination, the method further comprising:
determining that connectivity was allowed from the source and/or to the destination; and
providing an alert indicating that the first policy was not applied.

10. The method of claim 8, wherein the first policy is configured to deny connectivity from a source and/or a destination, the method further comprising:
determining that connectivity was denied from the source and/or to the destination; and
updating the utilization data for the first policy.

11. A system comprising:
at least one processor; and
at least one memory storing instructions, which when executed by the at least one processor, causes the at least one processor to:
receive, flow data that uniquely describes one of more packets traversing a network, wherein the flow data different than the one or more packets and the flow data is received outside a path the one or more packets are traversing;
determine, from the flow data, one or more endpoint groups associated with the one or more packets;
determine whether a first policy was enforced on the one or more packets based at least on part on whether a packet of the one or more packets was blocked or allowed at an endpoint of the one or more endpoint groups, wherein the first policy is associated with the one or more endpoint groups;
in response to the first policy being enforced, update utilization data for the first policy in a policy table;
determine, based on a comparison of utilization data in the policy table, whether the first policy is utilized more than a second policy; and
in response to determining that the first policy is utilized more than the second policy, reorder a first position of the first policy and a second position of the second policy in the policy table.

12. The system of claim 11, further comprising instructions which when executed by the at least one processor, causes the at least one processor to:
in response to determining that the first policy is not utilized more than the second policy, determine if the first policy has not been utilized for a period of time; and
in response to determining that the first policy has not been utilized for the period of time, delete the first policy from the policy table.

13. The system of claim 12, wherein the first policy is a whitelist policy.

14. The system of claim 11, wherein the flow data comprises data that is received from a network device, a hypervisor, a container, or a virtual machine.

15. The system of claim 11, further comprising instructions which when executed by the at least one processor, causes the at least one processor to:
present the utilization data of the first policy including at least one of a number of flows, a number of packets, or a quantity of data received by a network in relation to a period of time.

16. The system of claim 11, further comprising instructions which when executed by the at least one processor, causes the at least one processor to:
receive additional flow data; and
determine whether the first policy is applicable to the additional flow data.

17. The system of claim 16, wherein the first policy is configured to deny connectivity from a source and/or a destination, the system further comprising instructions which when executed by the at least one processor, causes the at least one processor to:
- determine that connectivity was allowed from the source and/or to the destination; and
- provide an alert indicating that the first policy was not applied.

18. The system of claim 16, wherein the first policy is configured to deny connectivity from a source and/or a destination, the system further comprising instructions which when executed by the at least one processor, causes the at least one processor to:
- determining that connectivity was denied from the source and/or to the destination; and
- updating the utilization data for the first policy.

19. At least one non-transitory computer-readable medium storing instructions, which when executed by at least one processor of a system, causes the system to:
- receive, flow data that uniquely describes one of more packets traversing a network, wherein the flow data different than the one or more packets and the flow data is received outside a path the one or more packets are traversing;
- determine, from the flow data, one or more endpoint groups associated with the one or more packets;
- determine whether a first policy was enforced on the one or more packets based at least on part on whether a packet of the one or more packets was blocked or allowed at an endpoint of the one or more endpoint groups, wherein the first policy is associated with the one or more endpoint groups;
- in response to the first policy being enforced, update utilization data for the first policy in a policy table;
- determine, based on a comparison of utilization data in the policy table, whether the first policy is utilized more than a second policy; and
- in response to determining that the first policy is utilized more than the second policy, reorder a first position of the first policy and a second position of the second policy in the policy table.

20. The at least one non-transitory computer-readable medium of claim 19, further comprising instructions which when executed by the at least one processor, causes the at least one processor to:
- in response to determining that the first policy is not utilized more than the second policy, determine if the first policy has not been utilized for a period of time; and
- in response to determining that the first policy has not been utilized for the period of time, delete the first policy from the policy table.

* * * * *